(12) United States Patent
Shore et al.

(10) Patent No.: US 8,981,967 B1
(45) Date of Patent: Mar. 17, 2015

(54) AIRCRAFT EQUIPMENT MANAGEMENT SYSTEM

(75) Inventors: Rebecca Shore, Seattle, WA (US); William Phillip Coop, Buckley, WA (US); Swanee Yourkowski, Burien, WA (US); Lois Hill, Renton, WA (US); Rocke Robert Koreis, Seattle, WA (US); Ronald Meir Sonntag, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 13/281,896

(22) Filed: Oct. 26, 2011

Related U.S. Application Data

(63) Continuation-in-part of application No. 12/858,572, filed on Aug. 18, 2010.

(51) Int. Cl.
 *G08B 21/00* (2006.01)
 *G01B 5/16* (2006.01)

(52) U.S. Cl.
 USPC ............................................ 340/945; 73/156

(58) Field of Classification Search
 USPC ............................................ 340/945; 73/156
 See application file for complete search history.

(56) References Cited

U.S. PATENT DOCUMENTS

| | | | |
|---|---|---|---|
| 4,209,491 A * | 6/1980 | Rich, III | 422/110 |
| RE36,199 E * | 4/1999 | Zhang et al. | 252/187.31 |
| 7,545,274 B2 | 6/2009 | Coop | |
| 7,551,086 B2 | 6/2009 | Coop et al. | |
| 7,589,636 B2 * | 9/2009 | Ayyagari et al. | 340/572.7 |
| 7,835,885 B2 * | 11/2010 | Ben-Tzur et al. | 702/188 |
| 7,854,639 B1 | 12/2010 | Leal et al. | |
| 7,907,578 B2 * | 3/2011 | Harvey et al. | 370/338 |
| 8,199,020 B1 * | 6/2012 | Kim | 340/601 |
| 8,248,239 B2 * | 8/2012 | Butler et al. | 340/572.1 |
| 2004/0108378 A1 * | 6/2004 | Gatz | 235/385 |
| 2006/0238305 A1 * | 10/2006 | Loving et al. | 340/10.1 |
| 2007/0215709 A1 | 9/2007 | Baude et al. | |
| 2007/0266782 A1 * | 11/2007 | Bartz et al. | 73/156 |
| 2010/0161207 A1 * | 6/2010 | Do | 701/200 |

OTHER PUBLICATIONS

AVOX Systems, Chemical Oxygen Generators, 2007.*
U.S. Appl. No. 12/858,572, filed Aug. 18, 2012, Shore et al.

* cited by examiner

*Primary Examiner* — Jennifer Mehmood
*Assistant Examiner* — Omar Casillashernandez
(74) *Attorney, Agent, or Firm* — Yee & Associates, P.C.

(57) ABSTRACT

Method and apparatus for managing equipment on an aircraft. An apparatus comprises an interrogator, a display system, and a processor unit. The interrogator is configured to read information from a set of wireless tags associated with a set of equipment in an aircraft. The processor unit is configured to identify the set of equipment from the information read from the set of wireless tags by the interrogator. The processor unit is further configured to display a layout of an interior of the aircraft on the display system. The processor unit is further configured to display a number of graphical indicators for the set of equipment on the layout in a number of locations on the layout corresponding to a number of locations of where the set of equipment is located in the interior of the aircraft.

18 Claims, 21 Drawing Sheets

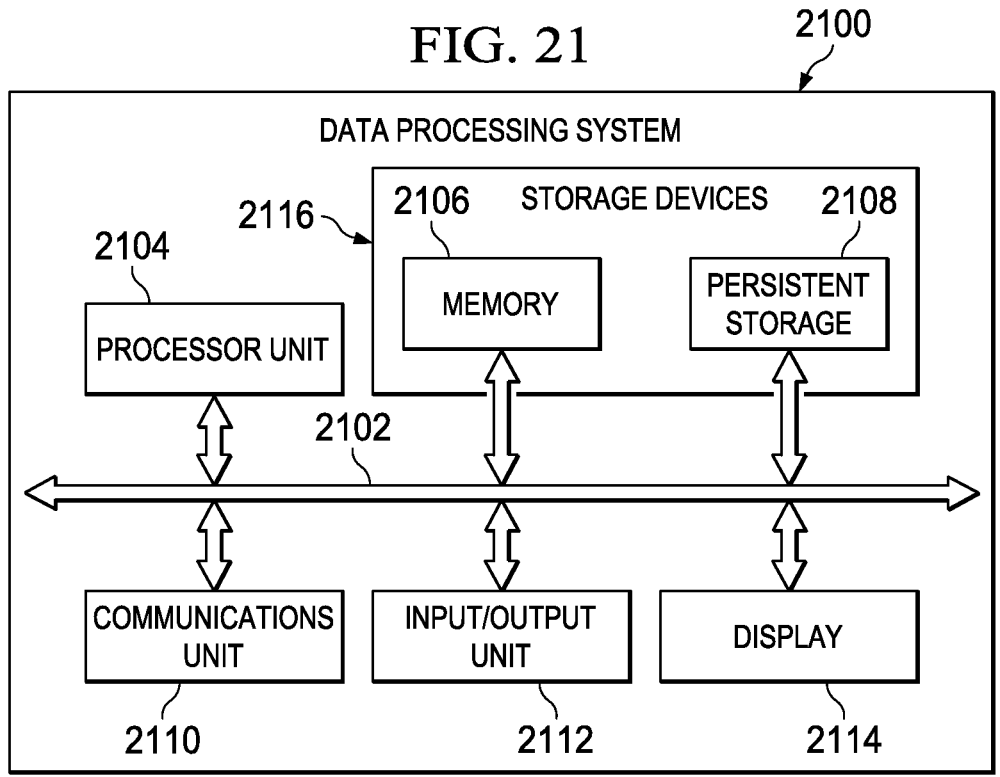
FIG. 21
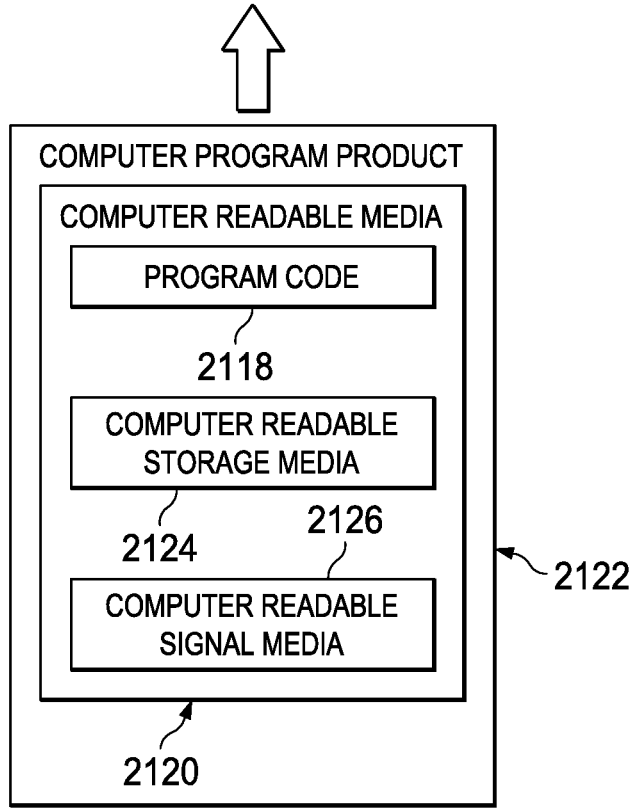

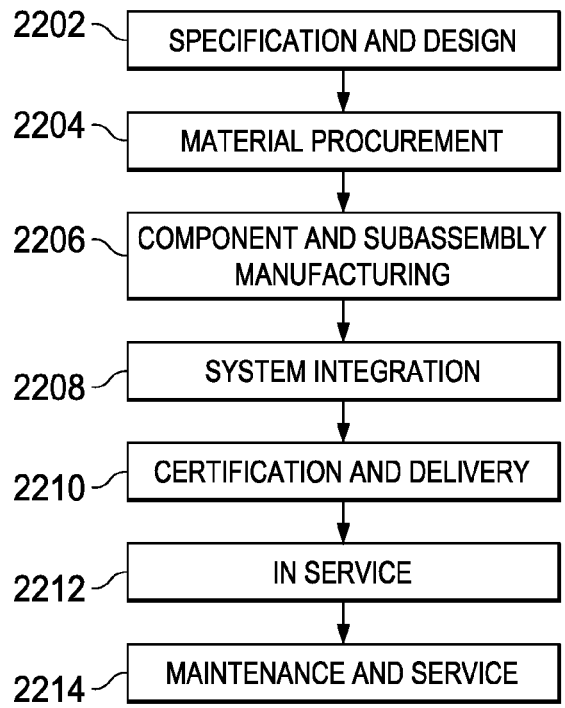
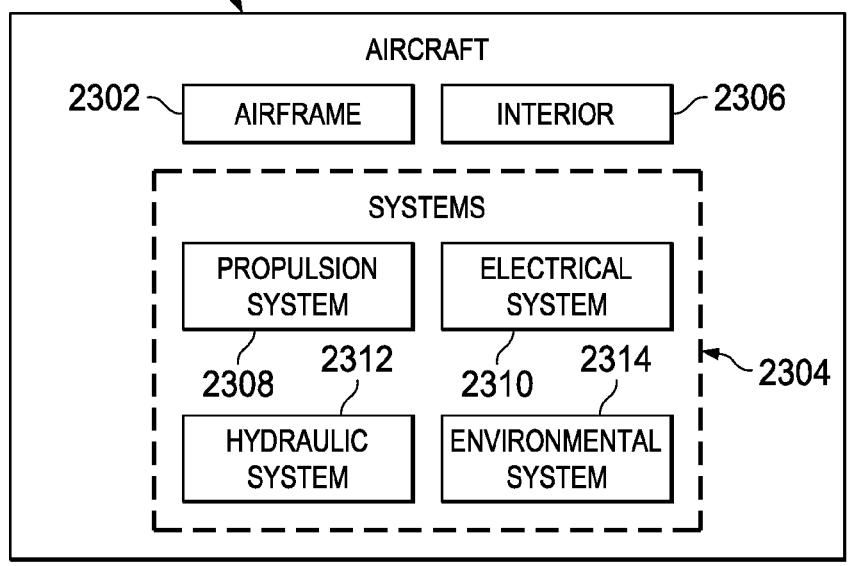

AIRCRAFT EQUIPMENT MANAGEMENT SYSTEM

CROSS-REFERENCE TO RELATED APPLICATION

This application is a continuation-in-part of U.S. patent application Ser. No. 12/858,572, filed Aug. 18, 2010, entitled "Aircraft Safety and Configuration Monitoring System and Method", which is incorporated herein by reference.

BACKGROUND INFORMATION

1. Field

The present disclosure relates generally to aircraft and, in particular, to managing equipment on an aircraft. Still more particularly, the present disclosure relates to a method and apparatus for identifying a status of equipment on an aircraft.

2. Background

Equipment in an aircraft is inspected at different times. Some equipment may be inspected between flights, while other equipment may be inspected during scheduled maintenance. The inspections are performed to determine whether the equipment is still present in the desired locations. The inspections also may be made to determine whether some equipment is not functioning as desired or has expired and needs replacement.

Currently many airlines perform these inspections during pre-flight, maintenance checks, and at other times to ensure that the necessary standard equipment items are present and in working condition. The equipment needs to be in working condition to allow the aircraft proper certification to operate.

The current manual monitoring processes may be time-consuming and prone to human error and thus may not identify all of the existing issues.

Further, equipment with expiration dates may not take full advantage of its life-span because its expiration date may be between inspection intervals, so they are replaced early. In other words, an inspection may indicate that a piece of equipment will expire before the next inspection. As a result, the piece of equipment may be replaced prior to the next inspection, resulting in early replacement.

Therefore, it would be advantageous to have a method and apparatus that takes into account at least some of the issues discussed above as well as possibly other issues.

SUMMARY

In one advantageous embodiment, an apparatus comprises an interrogator, a display system, and a processor unit. The interrogator is configured to read information from a set of wireless tags associated with a set of equipment in an aircraft. The processor unit is configured to identify the set of equipment from the information read from the set of wireless tags by the interrogator. The processor unit is further configured to display a layout of an interior of the aircraft on the display system. The processor unit is further configured to display a number of graphical indicators for the set of equipment on the layout in a number of locations on the layout corresponding to a number of locations of where the set of equipment is located in the interior of the aircraft.

In another advantageous embodiment, a method for managing equipment on an aircraft is provided. Information is read from a set of wireless tags associated with a set of equipment in the aircraft. The set of equipment is identified from the information read from the set of wireless tags by an interrogator. A layout of an interior of the aircraft is displayed on a display system. A number of graphical indicators is displayed for the set of equipment on the layout in a number of locations on the layout corresponding to a number of locations of where the set of equipment is located in the interior of the aircraft.

In yet another advantageous embodiment, an apparatus comprises a wireless tag. The wireless tag is configured to be connected to an oxygen generator. The wireless tag is further configured to indicate exposure of the wireless tag to a temperature at which the oxygen generator operates to generate oxygen.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 1A is an illustration of an RFID tag attached to an item to be monitored on board an aircraft in accordance with an advantageous embodiment;

FIG. 21 is an illustration of a data processing system in accordance with an advantageous embodiment;

FIG. 22 is an illustration of an aircraft manufacturing and service method in accordance with an advantageous embodiment; and FIG. 23 is an illustration of an aircraft in which an advantageous embodiment may be implemented.

DETAILED DESCRIPTION

The advantageous embodiments recognize and take into account that in order to automate the process and ensure continuous, accurate, and reliable monitoring of the equipment in an aircraft, radio frequency identification (RFID) interrogators may be integrated into pre-existing systems throughout the interior of the aircraft. The interrogators may sweep the aircraft and report issues through an on-board system to the flight deck, which may pass the information on to the airline maintenance operation check (AMOC) or equivalent system. The advantageous embodiments recognize and take into account that the airline maintenance operation check or other system may trigger actions in the supply chain and initiate necessary maintenance. The advantageous embodiments recognize and take into account that this process may reduce cycle time, improve on-time departures, and improve safety. Further, the advantageous embodiments recognize and take into account that this process may remove the manual procedures and reduce the potential for human error in current processes for maintaining equipment in an aircraft.

Figure 1:
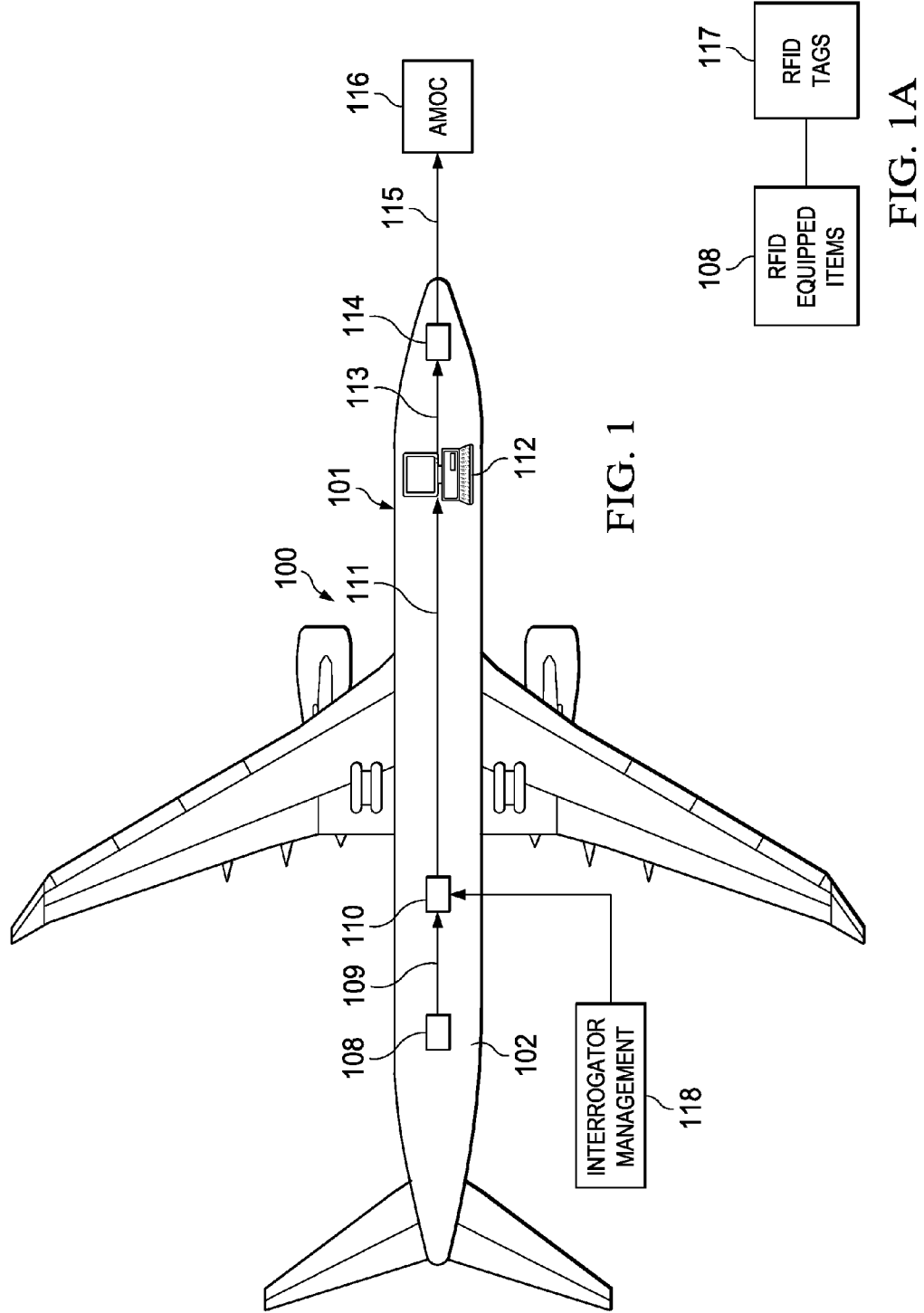
FIG. 1 is an illustration of an aircraft safety and configuration monitoring system in accordance with an advantageous embodiment.

With reference now to the figures and, in particular, with reference to FIGS. 1 and 1A, an illustration of an aircraft safety and configuration monitoring system is depicted in accordance with an illustrative embodiment. System 100 may include various Radio Frequency Identification (RFID) equipped items 108 which are to be monitored aboard aircraft 101. RFID equipped items 108 may be components of systems which are interspersed throughout the pressurized cabin in aircraft fuselage 102 of aircraft 101. RFID equipped items 108 may be components which require monitoring for the purpose of determining the need for periodic replacement and/or maintenance of the items throughout the service life of aircraft 101.

As shown in FIG. 1A, an illustration of an RFID tag attached to an item to be monitored on board an aircraft is depicted in accordance with an advantageous embodiment. RFID equipped items 108 may be fitted with RFID tags 117 as described in U.S. Pat. No. 7,545,274, which is incorporated by reference herein in its entirety. RFID tags 117 are configured to transmit radio frequency signals to RFID interrogators 110 to provide information about the status of RFID equipped items 108.

RFID interrogators 110 may communicate with RFID equipped items 108 through communication pathway 109. RFID interrogators 110 may be integrated into pre-existing systems throughout the pressurized cabin of aircraft fuselage 102. RFID interrogators 110 may be positioned throughout the entire pressurized cabin of aircraft fuselage 102 and may be configured to scan different areas of aircraft 101. RFID interrogators 110 may be configured to scan different areas of aircraft 101 through RFID interrogator management 118. Placement of RFID interrogators 110 throughout the cabin of aircraft 101 may change the processes from manual to automatic that are necessary during checks. The information collected by RFID interrogators 110 located in aircraft 101 may be automatically reported through an on-board system to flight deck 114.

Processor 112 may communicate with RFID interrogators 110 through communication pathway 111. In some embodiments, processor 112 may be an integrated cabin RFID interrogation system (ICRIS). Flight deck 114 of aircraft 101 may communicate with processor 112 through communication pathway 113. Flight deck 114 of aircraft 101 may communicate with airline maintenance operation check (AMOC) 116 or equivalent system through communication pathway 115. Accordingly, during monitoring of the aircraft configuration, which may take place during pre-flight procedures, RFID interrogators 110 may sweep aircraft 101 through communication pathway 109 to determine whether any of RFID equipped items 108 require service, repair, replacement, and/or maintenance. In the event that any of RFID equipped items 108 require service, repair, replacement, and/or maintenance, RFID interrogators 110 may report the requirement to processor 112 through communication pathway 111. Processor 112 may report the requirement to flight deck 114 through communication pathway 113. Flight deck 114 may record the requirement in the technical electronic logbook of aircraft 101 and transmit the requirement to AMOC 116. In turn, AMOC 116 may initiate the necessary service, repair, replacement, and/or maintenance procedures for one of RFID equipped items 108 that was identified. System 100 may provide accurate, real-time configuration management, safety and security, supply chain management, and maintenance planning information about aircraft 101 to AMOC 116. This process may result in fewer aircraft inspections, improved configuration management, improved safety, inventory reductions, and reduced labor required to validate part compliance.

Figure 2:
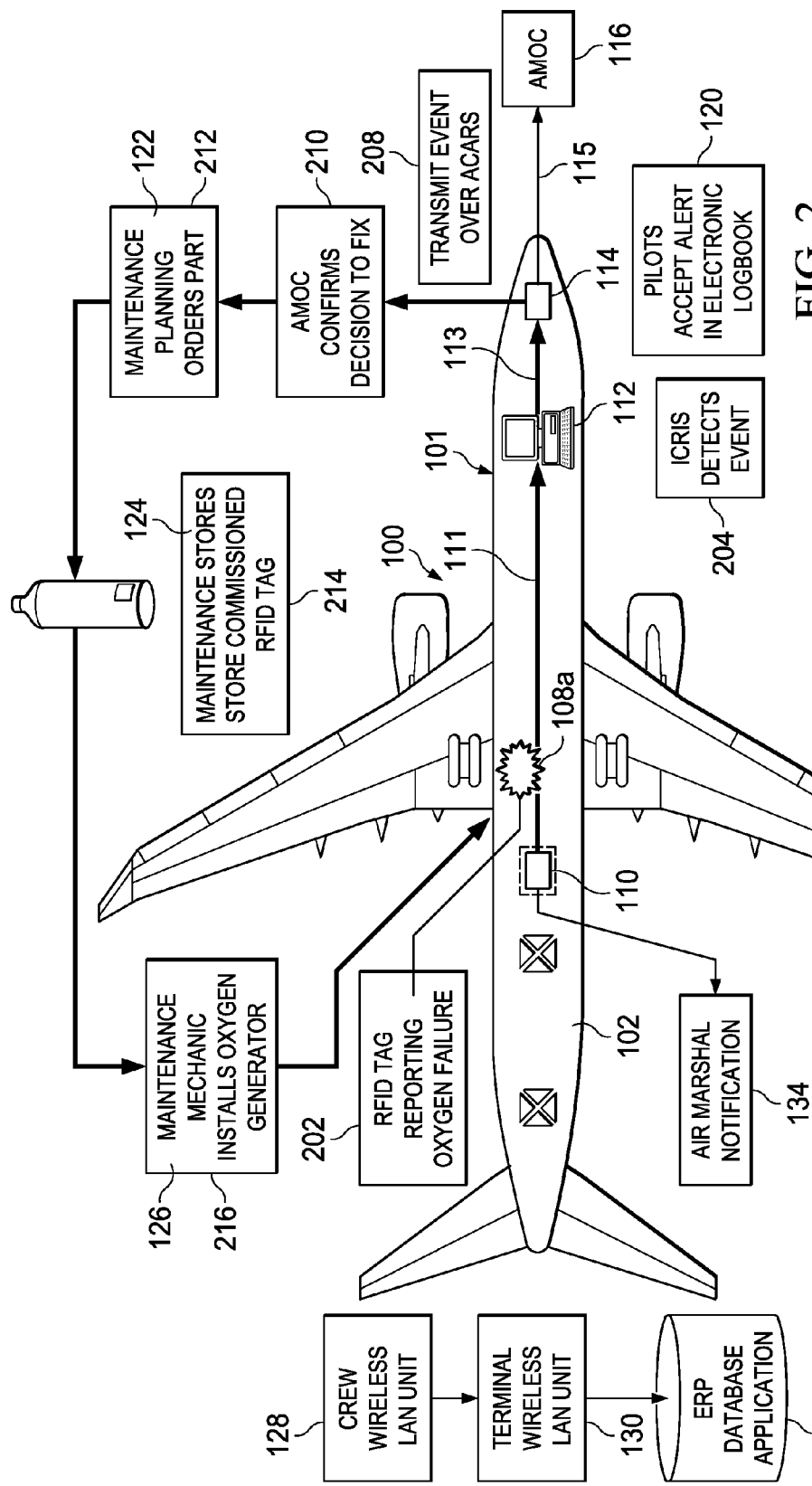
FIG. 2 is an illustration of an aircraft safety and configuration monitoring system in determining non-certification of an oxygen generator aboard an aircraft in accordance with an advantageous embodiment.

With reference now to FIG. 2, an illustration of an aircraft safety and configuration monitoring system in determining non-certification of an oxygen generator aboard an aircraft is depicted in accordance with an advantageous embodiment. In block 202, an RFID tag on oxygen generator 108a may report a non-certified status of oxygen generator 108a to RFID interrogator 110. The non-certified status of oxygen generator 108a may indicate that oxygen generator 108a is not certified to fly. In one illustrative example, oxygen generator 108a may not be certified to fly because oxygen generator 108a has been fired or is expired.

Next, in block 204, processor 112 may detect an event in the form of a non-certified status of oxygen generator 108a from the RFID tag and transmit the non-certified status of oxygen generator 108a to flight deck 114 in the form of an alert. In block 206, pilots of aircraft 101 may accept the non-certified status of oxygen generator 108a and may then record the non-certified status of oxygen generator 108a in technical electronic logbook 120 of aircraft 101.

In block 208, flight deck 114 may transmit the non-certified status of oxygen generator 108a to AMOC 116 over an aircraft communications addressing and reporting system (AC-ARS). In block 210, AMOC 116 may confirm the decision to service, repair, replace, or maintain oxygen generator 108a. In block 212, maintenance planning 122 may order replacement parts for oxygen generator 108a. In block 214, maintenance stores 124 may store the commissioned RFID tag of replacement oxygen generator 108a. In block 216, maintenance mechanic 126 may install replacement oxygen generator 108a in aircraft 101.

In another illustrative example, the non-certified status of oxygen generator 108a may be detected by crew wireless local area network (LAN) unit 128 and information regarding the non-certified status of oxygen generator 108a may be received by terminal wireless LAN unit 130. Enterprise resource planning (ERP) database application 132 may then receive the event and process the event accordingly.

In yet another illustrative example, information about a security seal may be detected by RFID interrogators 110 and transmitted to air marshal notification 134 for further action by security officers for aircraft 101.

Figure 3:
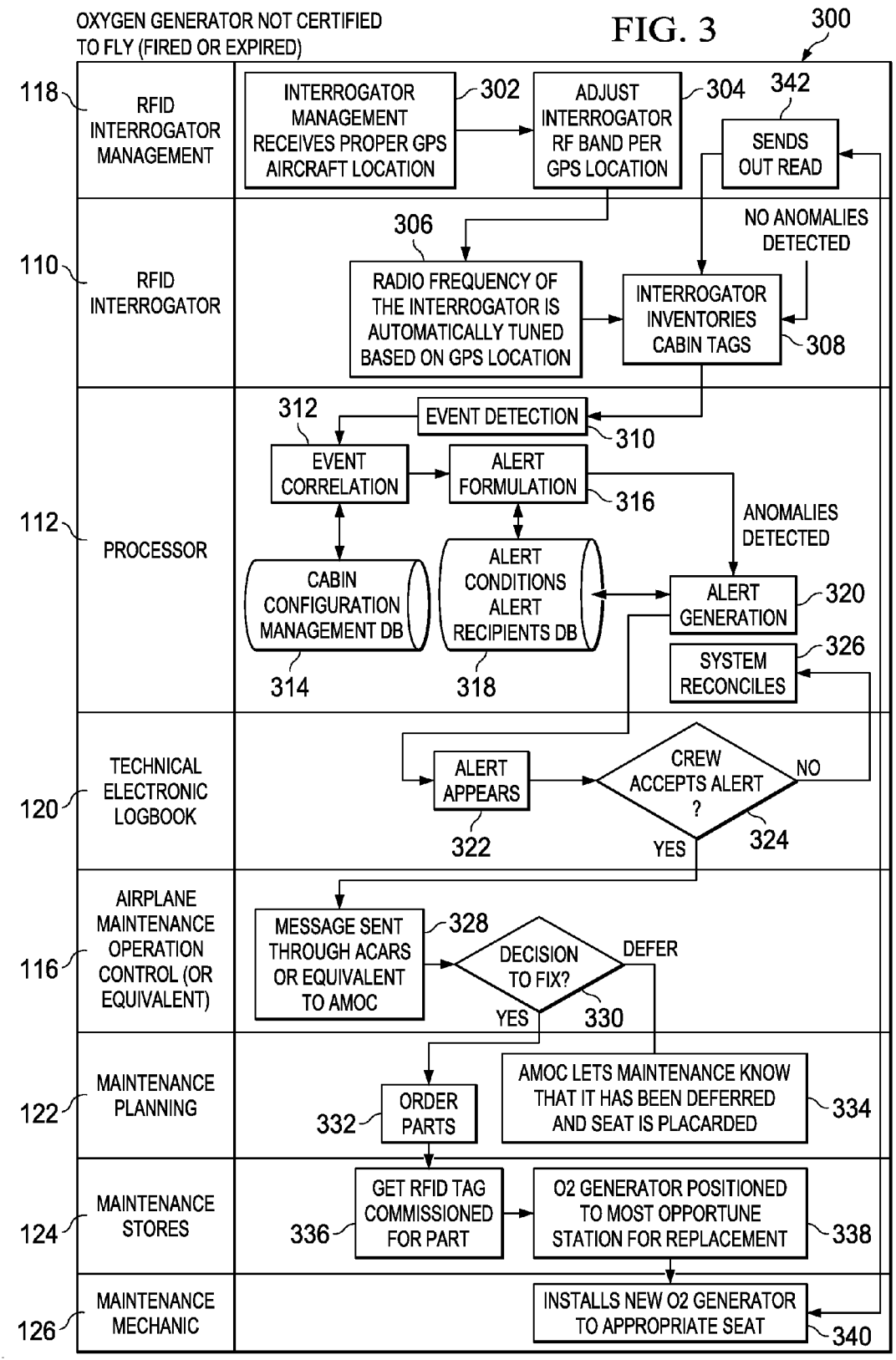
FIG. 3 is an illustration of a flow diagram of an aircraft safety and configuration monitoring system in determining non-certification of an oxygen generator aboard an aircraft in accordance with an advantageous embodiment.

With reference now to FIG. 3, an illustration of flow diagram 300 of an aircraft safety and configuration monitoring system in determining non-certification of an oxygen generator aboard an aircraft is depicted in accordance with an advantageous embodiment. In block 302, RFID interrogator management 118 may receive a proper global positioning system (GPS) aircraft location for aircraft 101. In block 304, RFID interrogator management 118 may adjust the interrogator radio frequency (RF) band per the GPS location. In block 306, the radio frequency of RFID interrogators 110 may be automatically tuned based on the GPS location. In block 308, RFID interrogators 110 may inventory the cabin RFID tags of RFID equipped items 108 in FIG. 1. In block 310, processor 112 may make an event detection. Event detection may include, for example, an indication that one of RFID equipped items 108 may not be functioning as desired and may need service, repair, replacement, and/or maintenance. In block 312, processor 112 may make an event correlation to compare configurations for certified parts with information received from RFID interrogators 110 using a cabin configuration management database in block 314. In block 316, processor 112 may make an alert formulation using an alert conditions and alert recipients database in block 318. In block 320, processor 112 may make an alert generation. In block 322, an alert may appear in technical electronic logbook 120 in flight deck 114 in FIG. 1. In block 324, the crew of aircraft 101 may accept or defer the alert which appears in technical electronic logbook 120 of aircraft 101. In block 326, system 100 may reconcile in the event that the crew does not accept the alert. In the event that the crew does accept the alert, in block 328 a message may be sent to AMOC 116.

In block 330, AMOC 116 may decide whether to service, repair, replace, or maintain oxygen generator 108a. In the event that a decision is made to service, repair, replace, or maintain oxygen generator 108a, in block 332 maintenance planning 122 may order a necessary part or parts for service, repair, replacement, or maintenance of oxygen generator 108a. In the event that the decision to service, repair, replace, or maintain oxygen generator 108a is deferred to AMOC 116, in block 334, AMOC 116 may inform maintenance that the decision has been deferred and the seat on aircraft 101 to which a new oxygen generator should be installed may be placarded to ensure safety of passengers in aircraft 101.

In block 336, maintenance stores 124 may commission an RFID tag for the part. In block 338, maintenance stores 124 may position the oxygen generator to the most opportune station for replacement on aircraft 101. In block 340, maintenance mechanic 126 may install the new oxygen generator to the appropriate seat on aircraft 101. In block 342, RFID interrogator management 118 may send out a read to RFID interrogators 110 which indicated the event.

The method described in FIG. 3 with respect to non-certification of oxygen generator 108a may be implemented in various other situations. These may include, for example, without limitation, circumstances in which a life vest has expired or is missing, and/or where emergency equipment has been tampered with or is missing. In regard to expiration of the life vest, maintenance planning 122 may order a replacement life vest and maintenance mechanic 126 may not be necessary for installation of the replacement life vest.

Under circumstances in which a life vest has been tampered with, generally the same steps described in FIG. 3 may be carried out. In one illustrative example, an RFID tag in the form of a tamper bag may be placed over the life vest cover. When the life vest is tampered with, the tag may tear, causing the antenna to break. The broken antenna in the torn RFID tag will result in a no-read by RFID interrogators 110. Maintenance planning 122 may then order a replacement life vest instead of an oxygen generator, and maintenance mechanic 126 may not be necessary for installation of the replacement life vest.

Under circumstances in which emergency equipment is missing or has been tampered with, generally the same steps described in FIG. 3 may be carried out. In one illustrative example, a no-read from RFID interrogators 110 may result because a piece of emergency equipment, such as a smoke detector, is missing. In another illustrative example, damage to a tamper bag for an emergency raft may result in a no-read from RFID interrogators 110. Maintenance planning 122 may then order a replacement piece of emergency equipment instead of a replacement oxygen generator. In other illustrative examples, the emergency equipment tested and replaced may include, for example, without limitation, an oxygen generator, a personal flotation device, a life raft, a fire extinguisher, a first-aid kit, a crash axe, and a flashlight.

A Use Case Description of non-certification of the oxygen generator (fired or expired) is presented in tabular form in Table (I) below.

TABLE I

| Oxygen Generator not Certified to Fly (Fired or Expired) | |
|---|---|
| Use Case Name | Oxygen generator is not certified to fly (oxygen generator is fired or is expired) |
| Purpose | Aircraft is able to self-diagnose when an oxygen generator is not certified to fly and will notify appropriate systems. The oxygen generator may have failed either |

TABLE I-continued

Oxygen Generator not Certified to Fly (Fired or Expired)

|  |  |
|---|---|
|  | because it has been exposed to a temperature of 400+ degrees Fahrenheit and fired, or has expired. |
| Actors | Pilot, Maintenance Operation Center, Maintenance Planning, Mechanic |
| Pre-condition | Oxygen generator may not be certified to fly for one of the following reasons:<br>1. Oxygen generator has reached 400+ degrees Fahrenheit and automatically recorded failure.<br>2. Oxygen generator has expired. |
| Steps | 1. Interrogator inventories cabin tags.<br>2. Integrated cabin RFID interrogation system (ICRIS) detects an event.<br>3. ICRIS correlates the event against the pre-defined as flying configuration.<br>4. ICRIS identifies which tag is missing and creates an alert.<br>5. ICRIS sends an alert to the Technical Electronic Logbook.<br>6. Alert appears to pilots that oxygen generator requires attention.<br>7. Pilot accepts indication.<br>8. ICRIS system reconciles to account for failed tag.<br>9. Indication is sent through ACARS or equivalent system to Airline Maintenance Operation Control (MOC) or equivalent.<br>10. MOC or equivalent accepts notification to fix the part.<br>11. MOC operator or equivalent orders the oxygen generator.<br>12. Maintenance store commissions a tag (including seat number and expiration date) for the specific seat and attaches it to the newly acquired oxygen generator.<br>13. Oxygen generator is positioned to most opportune station for replacement.<br>14. Mechanic installs the oxygen generator above the proper seat.<br>15. During the next interrogation read, the aircraft detects a new tag.<br>16. The information from the new tag is populated by ICRIS into the as-flying configuration database. |

Figure 4:
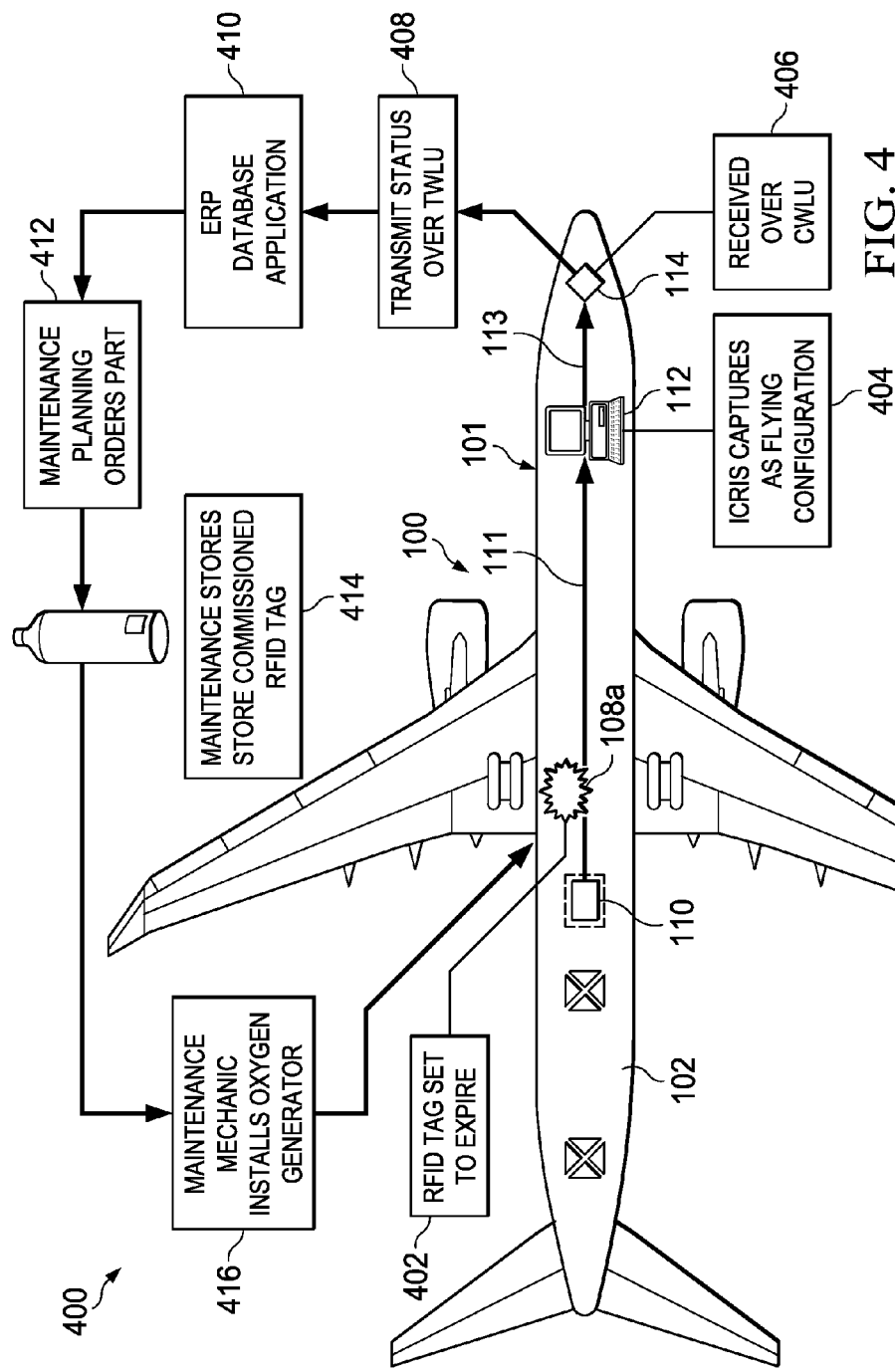
FIG. 4 is an illustration of an aircraft safety and configuration monitoring system in determining imminent expiration of an oxygen generator aboard an aircraft in accordance with an advantageous embodiment.

With reference now to FIG. 4, an illustration of an aircraft safety and configuration monitoring system in determining imminent expiration of an oxygen generator aboard an aircraft is depicted in block diagram 400 in accordance with an advantageous embodiment. In block 402, an RFID tag on oxygen generator 108a may be set to expire. In block 404, processor 112 may capture the expiration of the RFID tag and transmit the expired status of the RFID tag to flight deck 114. The expiration may be identified as part of an update to the flying configuration. A flying configuration is a snapshot equipment with RFID tags in the cabin of the aircraft. In block 406, pilots of aircraft 101 may accept the expired status of oxygen generator 108a received over a crew wireless LAN unit. The status may be recorded in technical electronic logbook 120 of aircraft 101.

In block 408, flight deck 114 may transmit the expired status of oxygen generator 108a over a terminal LAN wireless unit (TWLU) to ERP database application 410 in AMOC 116 in FIG. 1. In block 412, maintenance planning 122 may order a replacement oxygen generator 108a. In block 414, maintenance stores 124 may store a commissioned RFID tag of replacement oxygen generator 108a. In block 416, maintenance mechanic 126 may install the replacement oxygen generator in aircraft 101.

Figure 5:
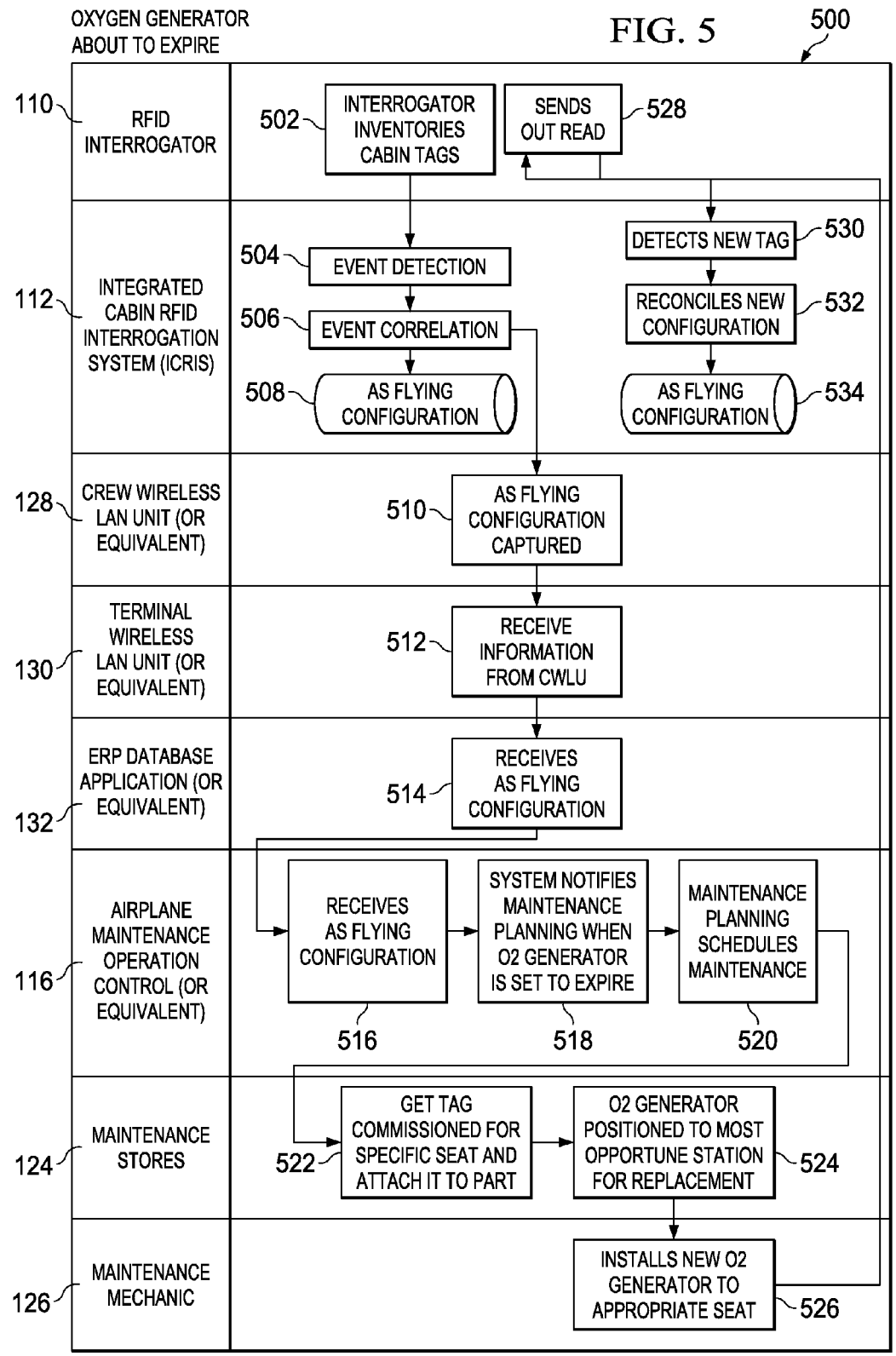
FIG. 5 is an illustration of a flow diagram of an aircraft safety and configuration monitoring system in determining imminent expiration of an oxygen generator aboard an aircraft in accordance with an advantageous embodiment.

Turning next to FIG. 5, an illustration of flow diagram 500 of an aircraft safety and configuration monitoring system in determining imminent expiration of an oxygen generator aboard an aircraft is depicted in accordance with an advantageous embodiment. In block 502, one of RFID interrogators 110 may inventory RFID tags on RFID equipped items 108 in FIG. 1. In block 504, processor 112 may make an event detection. In block 506, processor 112 may make an event correlation as a flying configuration in block 508. In block 510, crew wireless LAN unit 128 may capture the event as a flying configuration. In block 512, terminal wireless LAN unit 130 may receive information regarding the event. In block 514, ERP database application 132 may receive the event as a flying configuration. In block 516, AMOC 116 may receive the event as a flying configuration. In block 518, AMOC 116 may notify maintenance planning 122 when the oxygen generator is set to expire. In block 520, maintenance planning 122 may schedule maintenance.

In block 522, maintenance stores 124 may commission an RFID tag for a specific seat on aircraft 101 and attach the RFID tag to the part. In block 524, maintenance stores 124 may position the oxygen generator to the most opportune station for replacement. In block 526, maintenance mechanic 126 may install the replacement oxygen generator to the appropriate seat on aircraft 101.

The use case in which a life vest is scheduled to expire may follow the same steps as set forth in FIG. 5 with respect to imminent expiration of the oxygen generator. Maintenance mechanic 126 may not be necessary for installation of the replacement life vest. The use case in which emergency equipment is scheduled to expire may also follow the same steps as were set forth in FIG. 5.

A Use Case Description of imminent expiration of the oxygen generator is presented in tabular form in Table (II) below.

TABLE II

Imminent Expiration of Oxygen Generator

|  |  |
|---|---|
| Use Case Name | Oxygen generator is about to expire |
| Purpose | If an oxygen generator is scheduled to expire. |
| Actors | Maintenance Operation Center, Maintenance Planning, Mechanic |
| Pre-condition | Oxygen generator reaches threshold predetermined by airline to spur maintenance. |
| Steps | 1. Cabin RFID interrogation system scans the airplane and inventories cabin tags.<br>2. Integrated cabin RFID interrogation system (ICRIS) captures as-flying configuration.<br>3. When the airplane arrives at the gate the current plane configuration is automatically sent through Crew Wireless LAN Unit (CWLU) or an equivalent system to Terminal Wireless LAN Unit (TWLU) or an equivalent system.<br>4. Current plane configuration is |

TABLE II-continued

Imminent Expiration of Oxygen Generator sent to the ERP Database Application or equivalent system.
5. Current plane configuration is sent to Airplane Maintenance Operation Center or equivalent.
6. The Airplane Maintenance Operation Center or equivalent sends Maintenance Planner a message indicating the oxygen generator is set to expire when the generator has reached a pre-determined date of expiration.
7. Maintenance Planner schedules the maintenance into the Maintenance Scheduling Management system.
8. The maintenance store acquires a new oxygen generator and an RFID tag is commissioned for the oxygen generator identifying the expiration date and seat it will be installed on.
9. Oxygen generator is delivered to maintenance site.
10. Mechanic installs the oxygen generator in the proper position.
11. The interrogator reads the aircraft and detects a new tag.
12. The information from the new tag is populated into ICRIS stating the as-flying configuration database.

Figure 6:
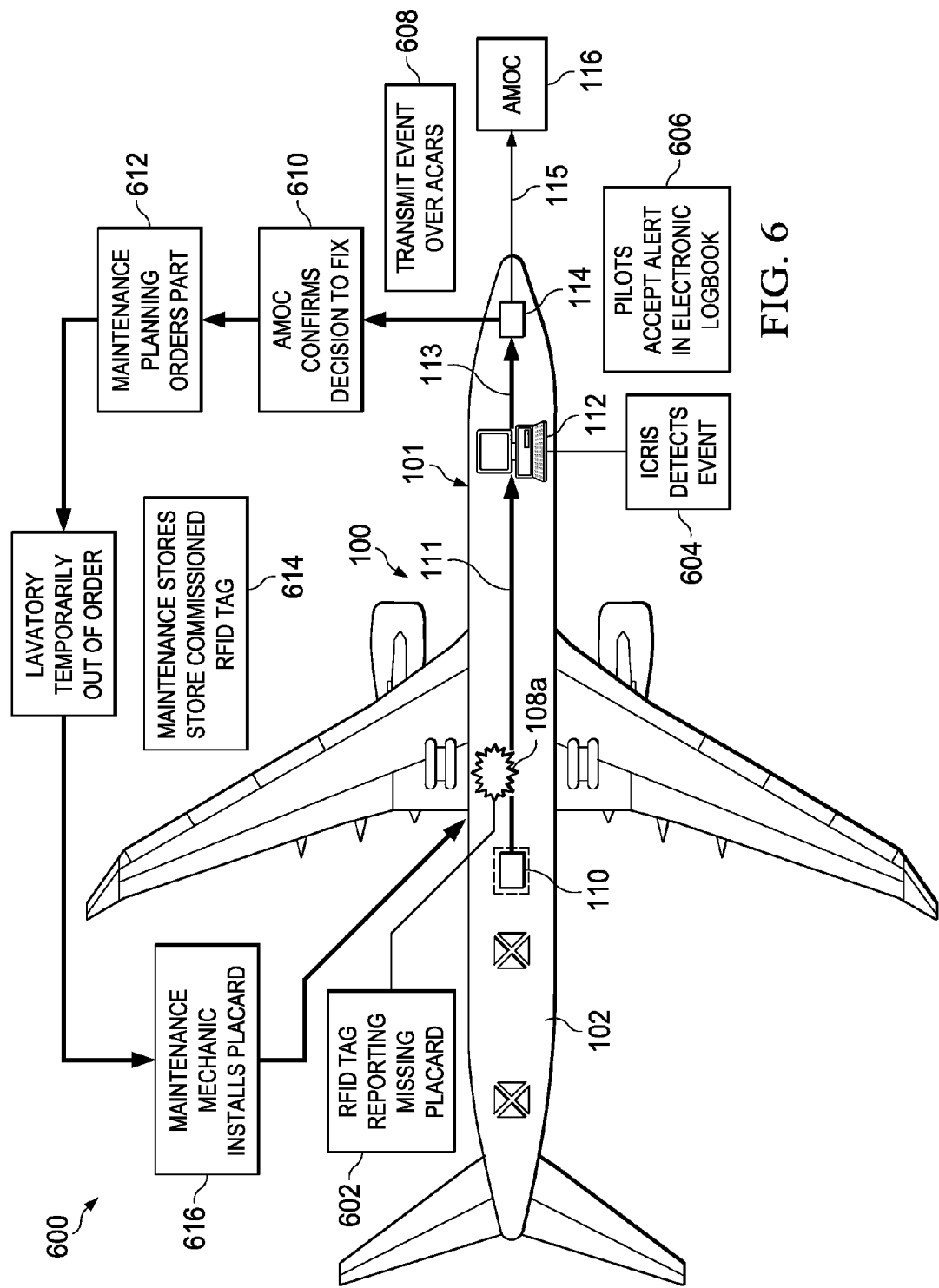
FIG. 6 is an illustration of an aircraft safety and configuration monitoring system in determining broken or missing status of a placard aboard an aircraft in accordance with an advantageous embodiment.

With reference now to FIG. 6, an illustration of an aircraft safety and configuration monitoring system in determining broken or missing status of a placard aboard an aircraft in accordance with an advantageous embodiment is depicted in block diagram 600. In block 602, an RFID tag may report the missing placard to RFID interrogators 110. In block 604, processor 112 may detect an event in the form of missing status of the placard from the RFID tag and transmit the event to flight deck 114 in the form of an alert. In block 606, pilots of aircraft 101 may accept the alert to the event which may be recorded in technical electronic logbook 120 of aircraft 101.

In block 608, flight deck 114 may transmit the event regarding the missing placard to AMOC 116 over ACARS. In block 610, AMOC 116 may confirm the decision to replace the missing placard. In block 612, maintenance planning 122 may order a replacement placard. In block 614, maintenance stores 124 may store the commissioned RFID tag of the replacement placard. In block 616, maintenance mechanic 126 may install replacement placard in aircraft 101.

Figure 7:
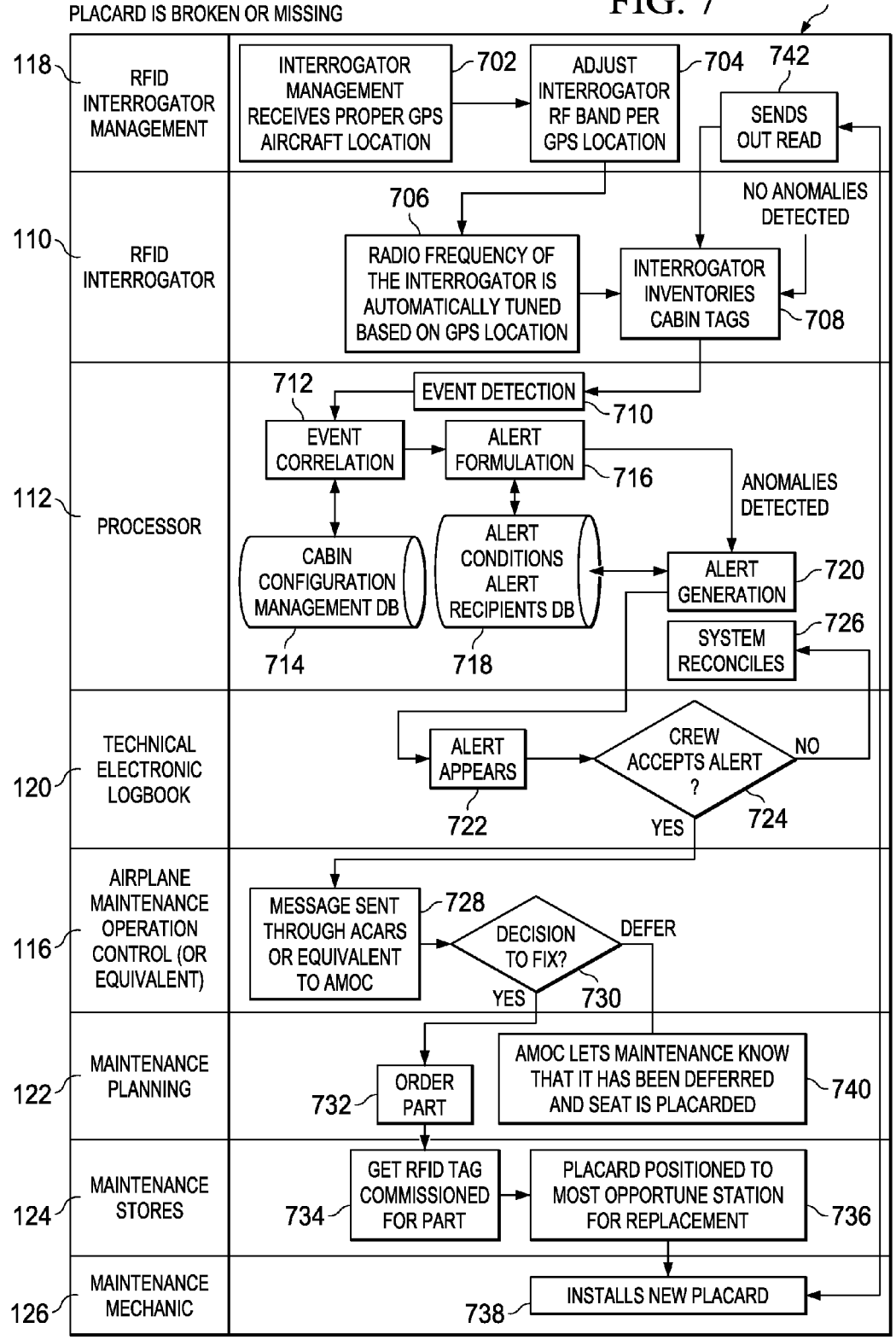
FIG. 7 is an illustration of a flow diagram of an aircraft safety and configuration monitoring system in determining broken or missing status of a placard aboard an aircraft in accordance with an advantageous embodiment.

Turning next to FIG. 7, flow diagram 700 of an aircraft safety and configuration monitoring system in determining broken or missing status of a placard aboard an aircraft is depicted in accordance with an advantageous embodiment. In block 702, RFID interrogator management 118 may receive a proper GPS aircraft location. In block 704, RFID interrogator management 118 may adjust the interrogator radio frequency (RF) band per the GPS location. In block 706, the radio frequency of RFID interrogators 110 may be automatically tuned based on the GPS location. In block 708, RFID interrogators 110 may inventory the RFID tags in the cabin of aircraft fuselage 102 of aircraft 101.

In block 710, processor 112 may detect an event regarding the missing placard. In block 712, processor 112 may make an event correlation using cabin configuration management database in block 714. In block 716, processor 112 may make an alert formulation using an alert conditions and alert recipients database in block 718. In block 720, processor 112 may make an alert generation. In block 722, an alert may appear on technical electronic logbook 120. In block 724, the crew may decide whether to accept the alert (block 728) or defer the alert (block 726).

If the crew decides to defer the alert, in block 726 processor 112 may reconcile system 100 in FIG. 1. If the crew decides to accept the alert, in block 728 a message is sent to AMOC 116. In block 730, a decision is made on whether to fix the issue (block 732) or to defer the issue (block 740). If the crew decides to fix the issue, in block 732, maintenance planning 122 may order the part. If the crew decides to defer the issue, in block 740 AMOC 116 may inform maintenance planning 122 that the decision has been deferred and the placard is placarded.

If maintenance planning 122 orders the part in block 732, maintenance stores 124 may have an RFID tag commissioned for a specific placard in block 734. In block 736, maintenance stores 124 may position the placard to the most opportune station for replacement. In block 738, maintenance mechanic 126 may install a new placard in aircraft 101. In block 742, RFID interrogator management 118 may send out a read to RFID interrogators 110 which indicated the event.

When processor 112 reads the number of emergency cards on aircraft 101 and that number is less than the expected number, the flight crew may be notified and new emergency cards may be delivered to aircraft 101. The flight crew may then be responsible for checking each seat and reconciling the problem so there is one emergency card per seat.

A Use Case Description of a broken or missing placard is presented in tabular form in Table (III) below.

TABLE III

| Broken or Missing Placard | |
|---|---|
| Use Case Name | Placard is broken or missing |
| Purpose | Aircraft is able to self-diagnose when a placard either is missing or is no longer attached to its intended home |
| Actors | Pilot, Maintenance Operation Center, Maintenance Planning, Mechanic |
| Pre-condition | Placard is not certified to fly for one of the following reasons: |
| Post-condition | A new oxygen generator has been installed on the airplane |
| Steps | 1. Interrogator inventories cabin tags.
2. Integrated cabin RFID interrogation system (ICRIS) detects an event.
3. ICRIS correlates the event against the pre-defined as flying configuration.
4. ICRIS identifies which tag is missing and creates an alert.
5. ICRIS sends an alert to the Technical Electronic Logbook.
6. Alert appears to pilots that placard is no longer present in intended position.
7. Pilot accepts alert.
8. ICRIS system reconciles to account for failed tag.
9. Alert is sent through ACARS or equivalent system to Airline Maintenance Operation Control (AMOC) or equivalent.
10. AMOC or equivalent accepts notification to replace the placard.
11. AMOC Operator or equivalent orders the placard. |

TABLE III-continued

Broken or Missing Placard

12. Maintenance store commissions a tag (including placard type and location) for the specific placard that is missing.
13. Placard is positioned to most opportune station for replacement.
14. Mechanic installs the placard in the proper location.

Figure 8:
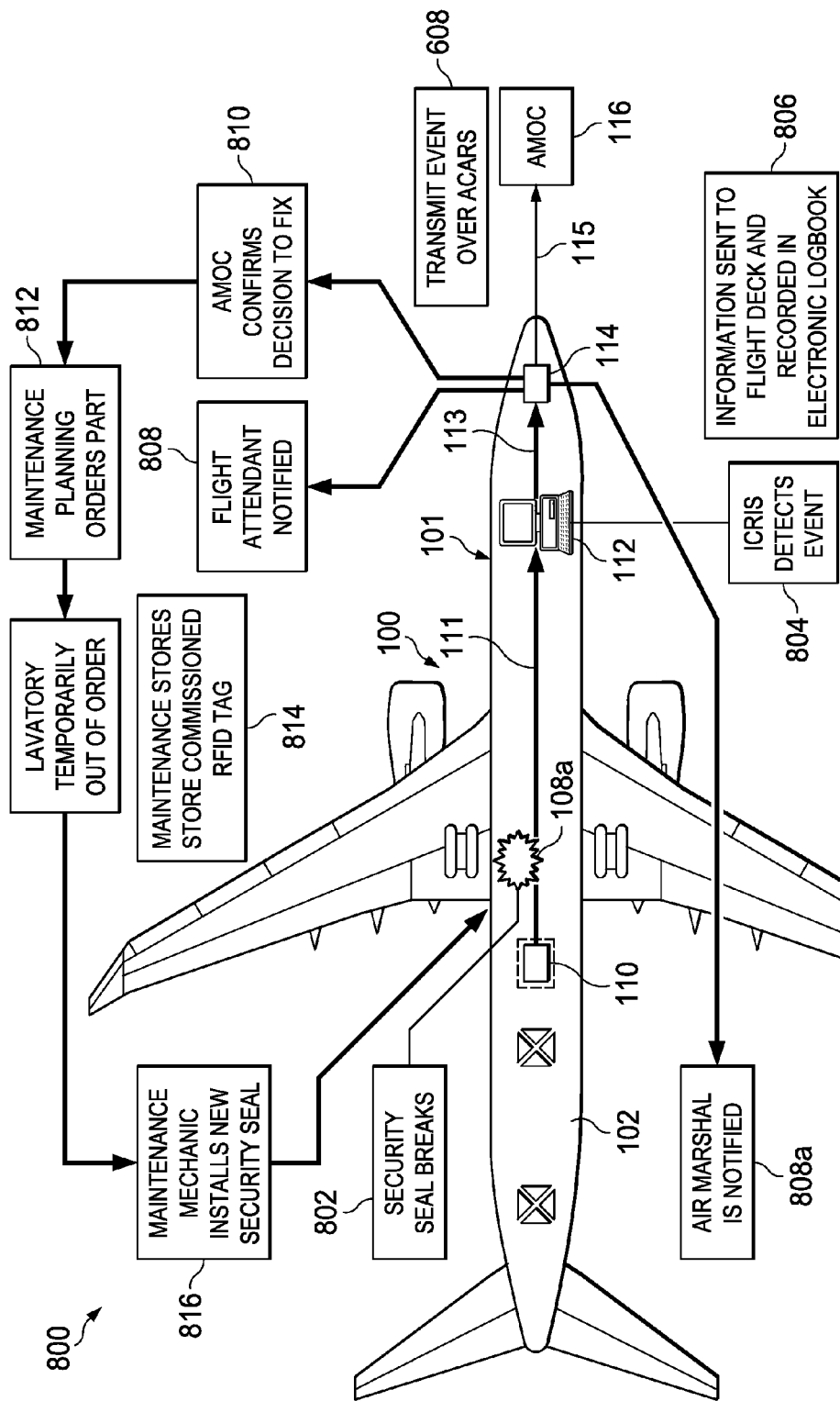
FIG. 8 is an illustration of an aircraft safety and configuration monitoring system in determining the presence of security seal breaks aboard an aircraft in accordance with an advantageous embodiment.

With reference now to FIG. 8, an illustration of a block diagram of an aircraft safety and configuration monitoring system in determining the presence of security seal breaks aboard an aircraft is depicted in accordance with an advantageous embodiment in block diagram 800. In block 802, an RFID tag may report a broken security seal to RFID interrogators 110. In block 804, processor 112 may detect an event in the form of a broken security seal from the RFID tag and transmit the event to flight deck 114. In block 806, information regarding the event may be transmitted to flight deck 114 over ACARS and recorded in technical electronic logbook 120 of aircraft 101.

In block 808, flight deck 114 may notify a flight attendant of the break of the security seal. In block 608, flight deck 114 may additionally or alternatively transmit the event regarding the broken security seal to AMOC 116. In block 810, AMOC 116 may confirm the decision to fix the broken security seal. In block 812, maintenance planning 122 may order a replacement security seal. In block 814, maintenance stores 124 may store the commissioned RFID tag of the replacement security seal. In block 816, maintenance mechanic 126 may install the replacement security seal in aircraft 101.

Figure 9:
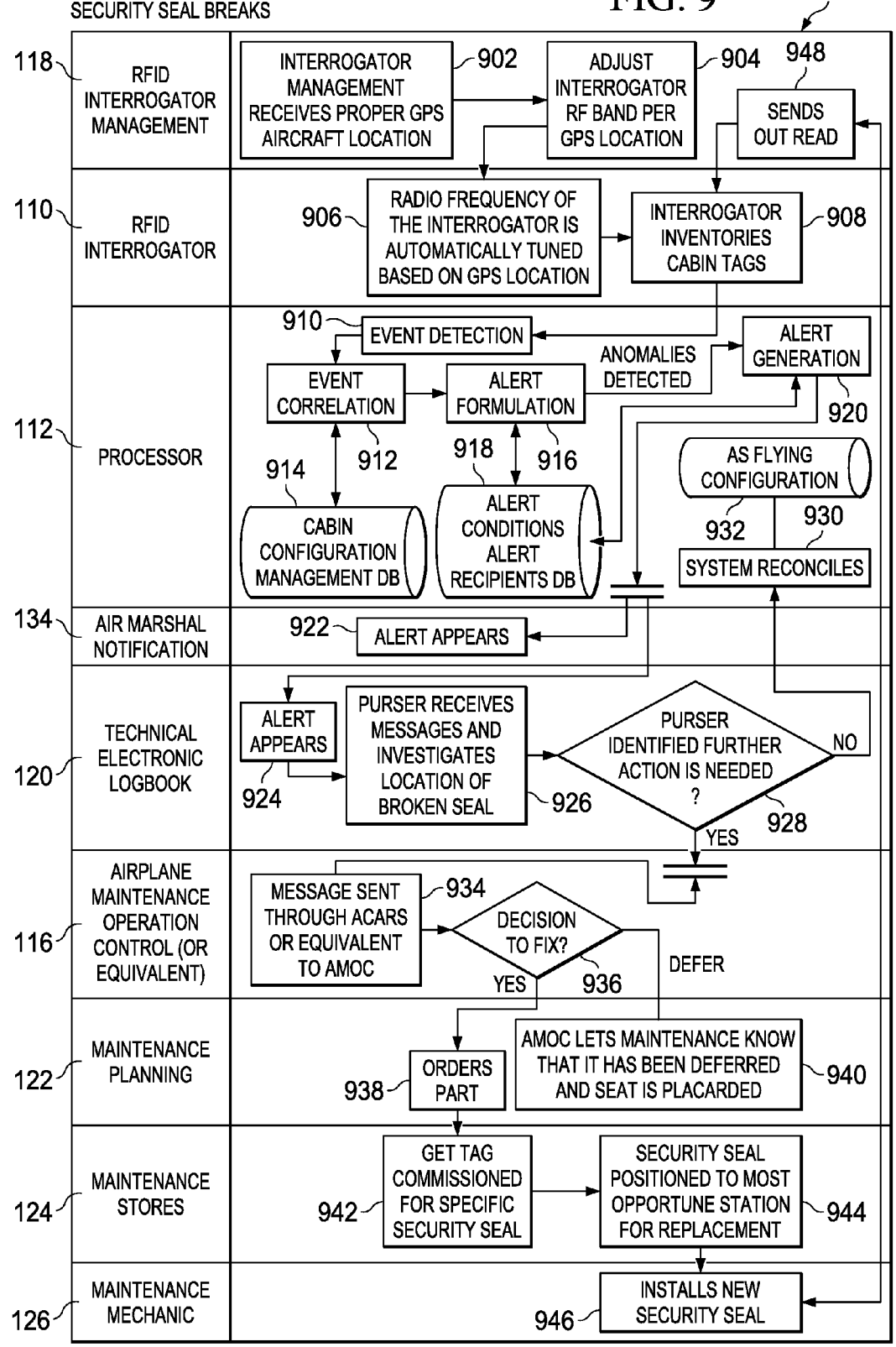
FIG. 9 is an illustration of a flow diagram of an aircraft safety and configuration monitoring system in determining the presence of security seal breaks aboard an aircraft in accordance with an advantageous embodiment.

Referring next to FIG. 9, an illustration of flow diagram 900 of an aircraft safety and configuration monitoring system in determining the presence of security seal breaks aboard an aircraft is depicted in accordance with an advantageous embodiment. In block 902, RFID interrogator management 118 may receive a proper GPS aircraft location. In block 904, RFID interrogator management 118 may adjust the interrogator radio frequency (RF) band per the GPS location. In block 906, the radio frequency of RFID interrogators 110 may be automatically tuned based on the GPS location. In block 908, RFID interrogators 110 may inventory the RFID tags in the cabin of aircraft fuselage 102 of aircraft 101 in FIG. 1.

In block 910, processor 112 may detect an event regarding the broken security seal. In block 912, processor 112 may make an event correlation using cabin configuration management database 914. In block 916, processor 112 may make an alert formulation using an alert conditions and alert recipients database 918. In block 920, processor 112 may make an alert generation. In block 922, an alert may appear on air marshal notification 134. In block 924, an alert may additionally or alternatively appear in technical electronic logbook 120. In block 926, the airline purser may receive the messages regarding the broken security seal and investigate the location of the broken security seal. In block 928, the purser may identify whether further action is needed. If further action is not needed, the system reconciles in block 930 as flying configuration in block 932.

In block 934, the messages regarding the broken security seal may be transmitted to AMOC 116. In block 936, a decision may be made regarding whether to fix the security seal. If AMOC 116 decides to fix the broken security seal in block 936, maintenance planning 122 may order a replacement security seal in block 938. If the decision to fix in block 936 is deferred, AMOC 116 may notify maintenance planning 122 of the deferral and a placard may be placed in block 940.

If maintenance planning 122 orders a replacement security seal in block 938, maintenance stores 124 may commission an RFID tag for a specific replacement security seal in block 942. In block 944, maintenance stores 124 may position the replacement security seal to the most opportune station for replacement. In block 946, maintenance mechanic 126 may install the replacement security seal in aircraft 101. In block 948, RFID interrogator management 118 may send out a read to RFID interrogators 110 which indicated the event.

Figure 10:
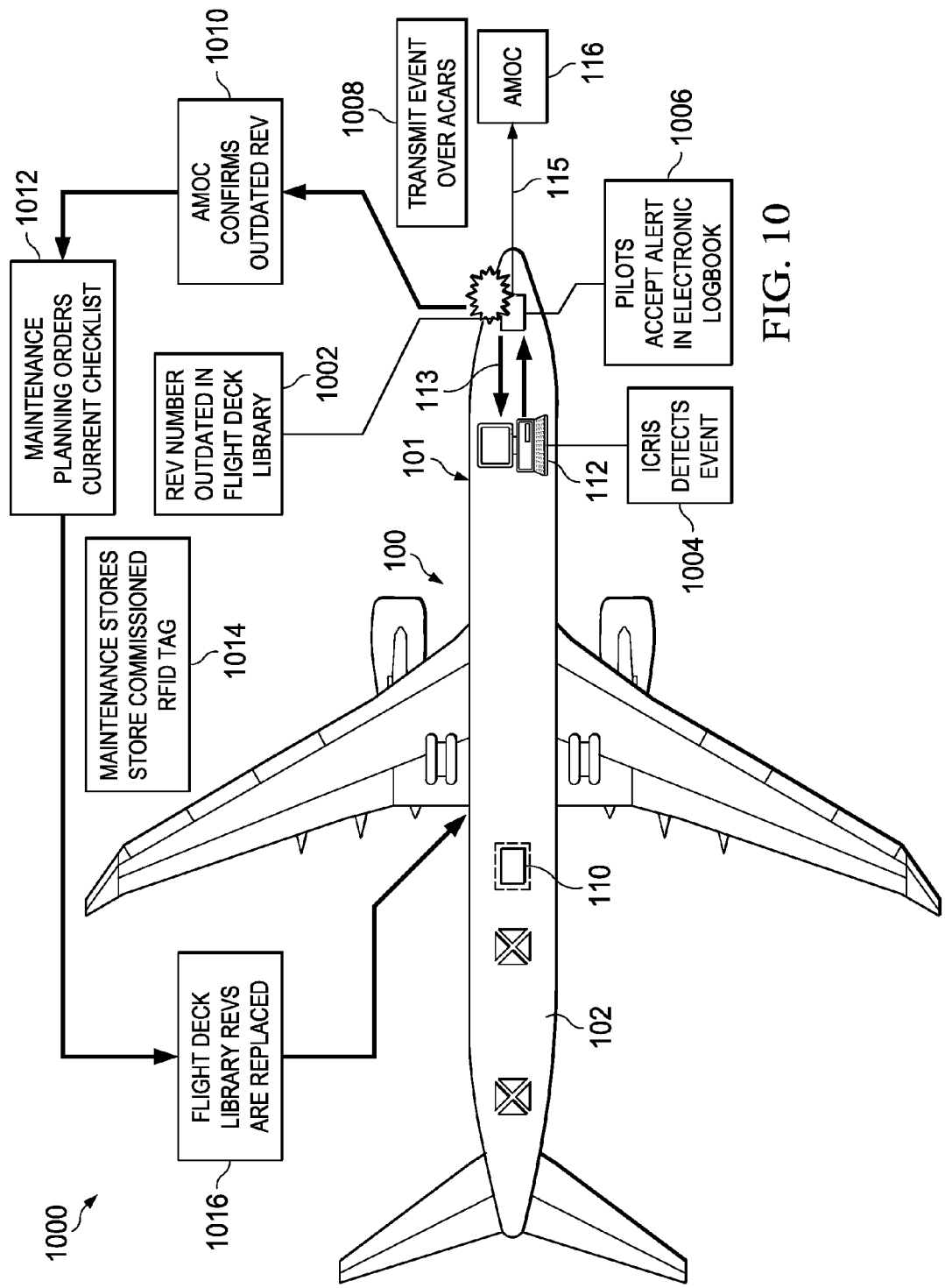
FIG. 10 is an illustration of an aircraft safety and configuration monitoring system in determining whether flight deck library checklist revs aboard an aircraft are out of date in accordance with an advantageous embodiment.

With reference now to FIG. 10, an illustration of an aircraft safety and configuration monitoring system in determining whether flight deck library checklist revs aboard an aircraft are out of date is depicted in accordance with an advantageous embodiment in block diagram 1000. In block 1002, an RFID tag may report that a rev number is outdated in a flight deck library of flight deck 114. In block 1004, processor 112 may detect an event in the form of an outdated rev number in the flight deck library and transmit the outdated status of the rev number in the flight deck library to technical electronic logbook 120 of flight deck 114 in the form of an alert. In block 1006, pilots of aircraft 101 may accept the alert recorded in technical electronic logbook 120 of aircraft 101.

In block 1008, flight deck 114 may transmit the event regarding the outdated rev number in the flight deck library to AMOC 116 over ACARS. In block 1010, AMOC 116 may confirm the outdated rev number. In block 1012, maintenance planning 122 may order a current checklist. In block 1014, maintenance stores 124 may store the commissioned RFID tag of the current checklist. In block 1016, the flight deck library revs may be replaced.

Figure 11:
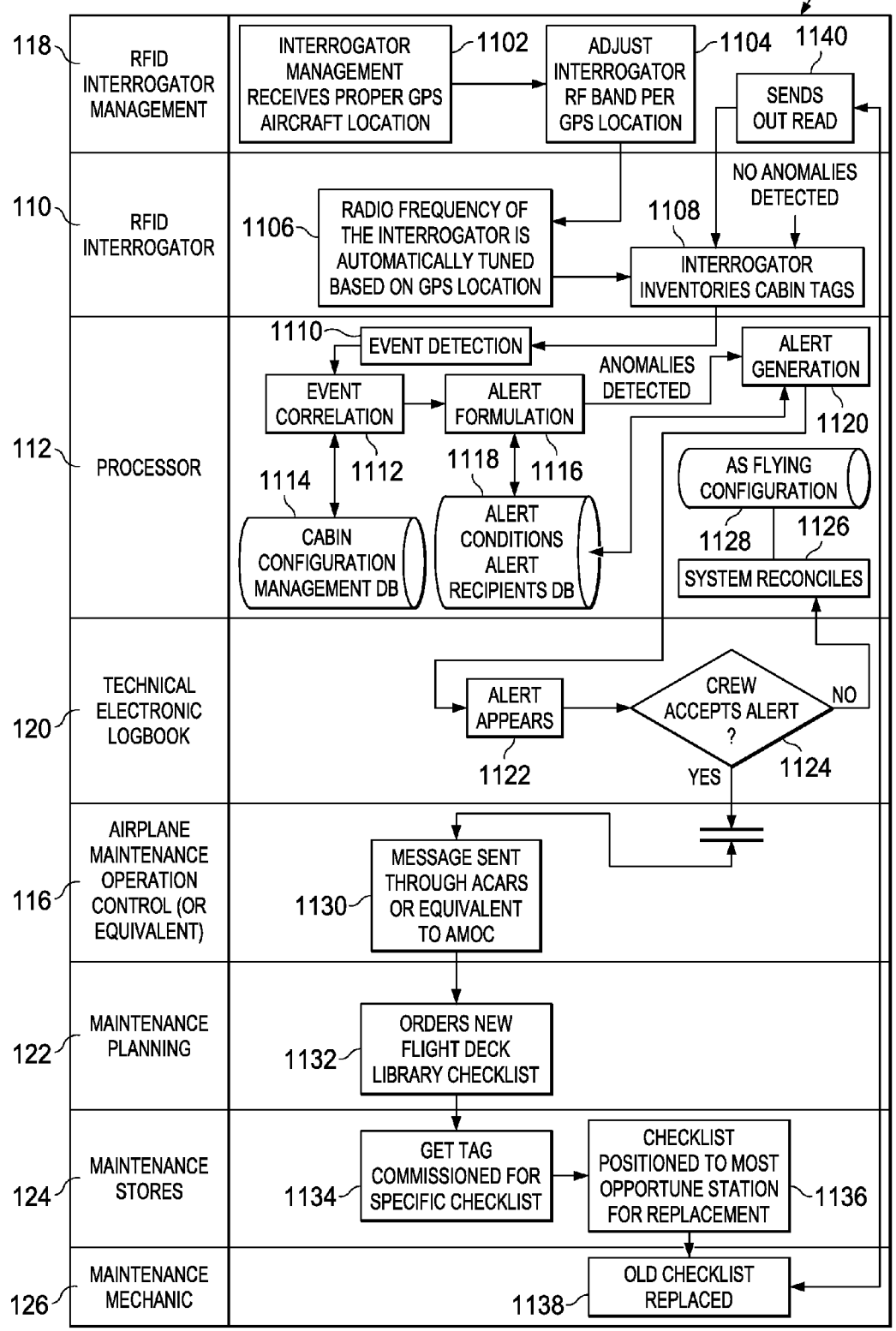
FIG. 11 is an illustration of a flowchart of an aircraft safety and configuration monitoring system in determining whether flight deck library checklist revs aboard an aircraft are out of date in accordance with an advantageous embodiment.

With reference now to FIG. 11, an illustration of flowchart 1100 of an aircraft safety and configuration monitoring system in determining whether flight deck library checklist revs aboard an aircraft are out of date is depicted in accordance with an advantageous embodiment. In block 1102, RFID interrogator management 118 may receive a proper GPS aircraft location for aircraft 101. In block 1104, RFID interrogator management 118 may adjust the interrogator radio frequency (RF) band per the GPS location. In block 1106, the radio frequency of RFID interrogators 110 may be automatically tuned based on the GPS location. In block 1108, RFID interrogators 110 may inventory the cabin RFID tags of RFID equipped items 108 in FIG. 1. In block 1110, processor 112 may make an event detection. In block 1112, processor 112 may make an event correlation using a cabin configuration management database in block 1114. In block 1116, processor 112 may make an alert formulation using an alert conditions and alert recipients database in block 1118. In block 1120, processor 112 may make an alert generation.

In block 1122, an alert may appear in technical electronic logbook 120 in flight deck 114. In block 1124, the crew of aircraft 101 may accept or defer the alert which appears in technical electronic logbook 120 of aircraft 101. In block 1126, system 100 may reconcile as a flying configuration (block 1128) in the event that the crew does not accept the alert. In the event that the crew does accept the alert, in block 1130 a message may be sent to AMOC 116.

In block 1132, maintenance planning 122 may order a new flight deck library checklist. In block 1134, maintenance stores 124 may commission an RFID tag for the specific checklist. In block 1136, maintenance stores 124 may position the checklist to the most opportune station for replacement on aircraft 101. In block 1138, the checklist may be replaced on aircraft 101 by maintenance mechanic 126. In block 1140, RFID interrogator management 118 may send out a read to RFID interrogators 110 which indicated the event.

A Use Case Description of security seal breakage is presented in tabular form in Table (IV) below.

TABLE IV

| Security Seal Breaks | |
| --- | --- |
| Use Case Name | Security seal breaks |
| Purpose | If a security seal breaks anywhere within the interior cabin, the appropriate personnel will be notified during flight. |
| Actors | Air Marshal, Flight Attendants, Maintenance Operation Center, Maintenance Planning, Mechanic |
| Pre-condition | Security seals that have been tampered with can be found on the following items within the cabin:<br>1. Door Seals<br>2. Smoke Detector<br>3. Security Seals on panels<br>4. Lavatory shrouds |
| Post-condition | Proper personnel have been notified and a new security seal has been installed. |
| Steps | 1. Interrogator inventories cabin tags.<br>2. Integrated cabin RFID interrogation system (ICRIS) detects an event.<br>3. ICRIS correlates the event against the pre-defined as flying configuration.<br>4. ICRIS identifies which tag has been tampered with and creates an alert.<br>5. ICRIS sends an alert to the purser through the flight crew tech log or similar system and if applicable the on-board air marshal.<br>6. Alert appears showing the location of the tampered security seal.<br>7. The Purser takes care of the situation as he/she sees fit. If a new part is needed to be ordered the Purser sends the alert through the tech log that a new security seal is needed.<br>8. ICRIS system reconciles to account for failed tag.<br>10. AMOC or equivalent accepts notification for the broken seal.<br>11. AMOC Operator or equivalent orders new security seal.<br>12. Maintenance store commissions a tag for the specific location of security. |

Figure 12:
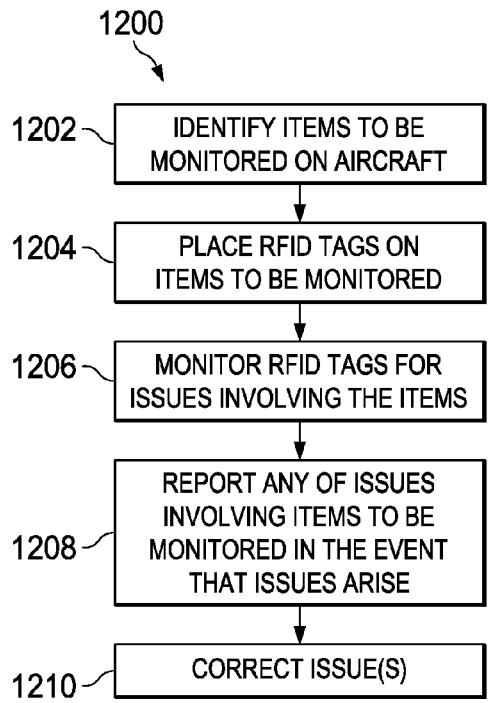
FIG. 12 is an illustration of a flowchart of an aircraft safety and configuration monitoring system in accordance with an advantageous embodiment.

Referring next to FIG. 12, an illustration of flowchart 1200 of an aircraft safety and configuration monitoring system is depicted in accordance with an advantageous embodiment. In block 1202, items to be monitored on an aircraft may be identified. In various applications, the items may include, for example, without limitation, oxygen generators, placards, security seals, life vests, emergency equipment, and/or a flight deck library checklist. In block 1204, RFID tags may be placed on each of the items to be monitored. In block 1206, the RFID tags may be monitored for issues involving the items. In block 1208, any of the issues involving the items to be monitored may be reported in the event that any of the issues arise. In some embodiments, any of the issues that arise may be reported to an airline maintenance operation control system. In block 1210, the issue or issues may be corrected.

Figure 13:
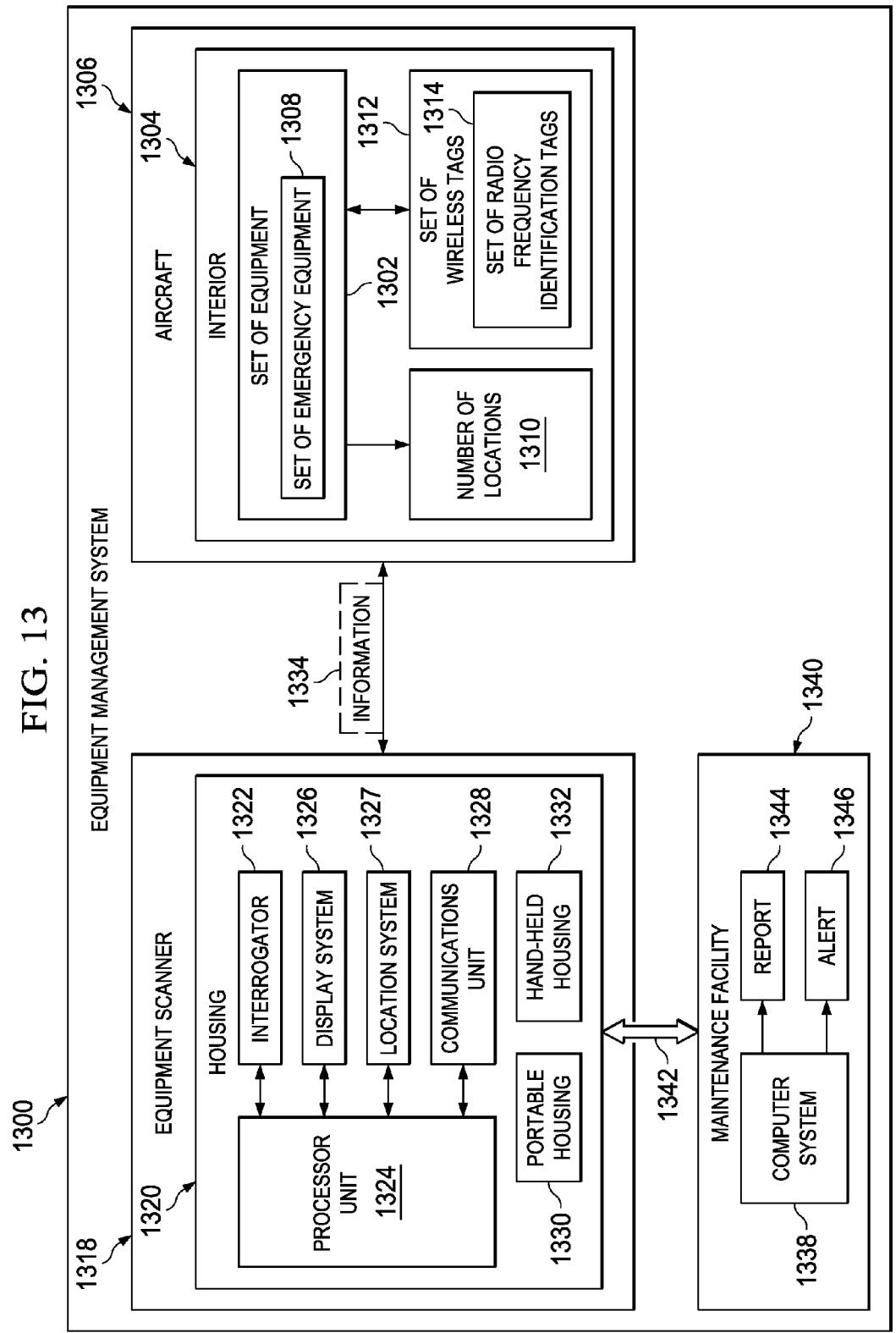
FIG. 13 is an illustration of a block diagram of an equipment management system in accordance with an advantageous embodiment.

Turning next to FIG. 13, an illustration of a block diagram of an equipment management system is depicted in accordance with an advantageous embodiment. Equipment management system 1300 is an example of a system that may be used in system 100 in FIG. 1.

In this illustrative example, set of equipment 1302 is located in interior 1304 of aircraft 1306. Set of equipment 1302 may include, for example, set of emergency equipment 1308. Set of emergency equipment 1308 may be selected from, for example, at least one of an oxygen generator, a personal flotation device, a life raft, a flashlight, and a fire extinguisher. As used herein, a "set", when used with reference to items, means one or more items. For example, "set of equipment 1302" is one or more pieces of equipment.

In particular, set of equipment 1302 is located in number of locations 1310 in interior 1304 of aircraft 1306. Additionally, set of wireless tags 1312 is associated with set of equipment 1302. The association is a physical association in these depicted examples. A first component, a wireless tag in set of wireless tags 1312, may be considered to be associated with a second component, a piece of equipment in set of equipment 1302, by being secured to the second component, bonded to the second component, mounted to the second component, welded to the second component, fastened to the second component, and/or connected to the second component in some other suitable manner. The first component also may be connected to the second component using a third component. The first component also may be considered to be associated with the second component by being formed as part of and/or an extension of the second component.

Set of wireless tags 1312 may take the form of set of radio frequency identification tags 1314. Set of wireless tags 1312 may be used to identify number of locations 1310 for set of equipment 1302.

One manner in which set of equipment 1302 may be identified within interior 1304 of aircraft 1306 is through equipment scanner 1318. Equipment scanner 1318 may be moved by an operator through interior 1304 of aircraft 1306 to identify set of equipment 1302.

As depicted, equipment scanner 1318 includes housing 1320, interrogator 1322, processor unit 1324, display system 1326, location system 1327, and communications unit 1328. Interrogator 1322, processor unit 1324, display system 1326, and communications unit 1328 are hardware components associated with housing 1320.

Housing 1320 is portable housing 1330 in these depicted examples. Portable housing 1330 is a housing that may be carried, moved, or a combination of the two by a human operator. In some cases, housing 1320 may be hand-held housing 1332. Hand-held housing 1332 is a housing that may be carried in one or two hands of a human operator.

In these illustrative examples, interrogator 1322 is configured to read information 1334 from set of wireless tags 1312 that is associated with set of equipment 1302 in interior 1304 of aircraft 1306. Processor unit 1324 is configured to identify set of equipment 1302 from information 1334 read from set of wireless tags 1312 by interrogator 1322.

Location system 1327 may provide an identification of the current location of equipment scanner 1318. In other words, location system 1327 may identify the location of equipment scanner 1318 in interior 1304 of aircraft 1306. Location system 1327 may be implemented using at least one of a global positioning system receiver, an inertial measurement unit, and other suitable types of location devices.

Information 1334 is sent to computer system 1338 over communications link 1342 established using communications unit 1328. In these illustrative examples, communications link 1342 is a wireless communications link. In some cases, communications link 1342 may be a wired communications link, such as using a wire, cable, or an optical cable. When communications link 1342 is a wireless communications link, information 1334 may be sent while equipment scanner 1318 is still located in interior 1304 of aircraft 1306.

Further, processor unit 1324 may send information 1334 to computer system 1338 at maintenance facility 1340. Computer system 1338 is one or more computers. When more than one computer is present in computer system 1338, the computers may be in communication with each other.

In these illustrative examples, computer system 1338 may generate report 1344 using information 1334. Further, computer system 1338 also may generate alert 1346. Alert 1346 may be generated if action needs to be taken with respect to set of equipment 1302. For example, alert 1346 may be generated if a piece of equipment in set of equipment 1302 needs maintenance, replacement, or some other action.

Figure 14:
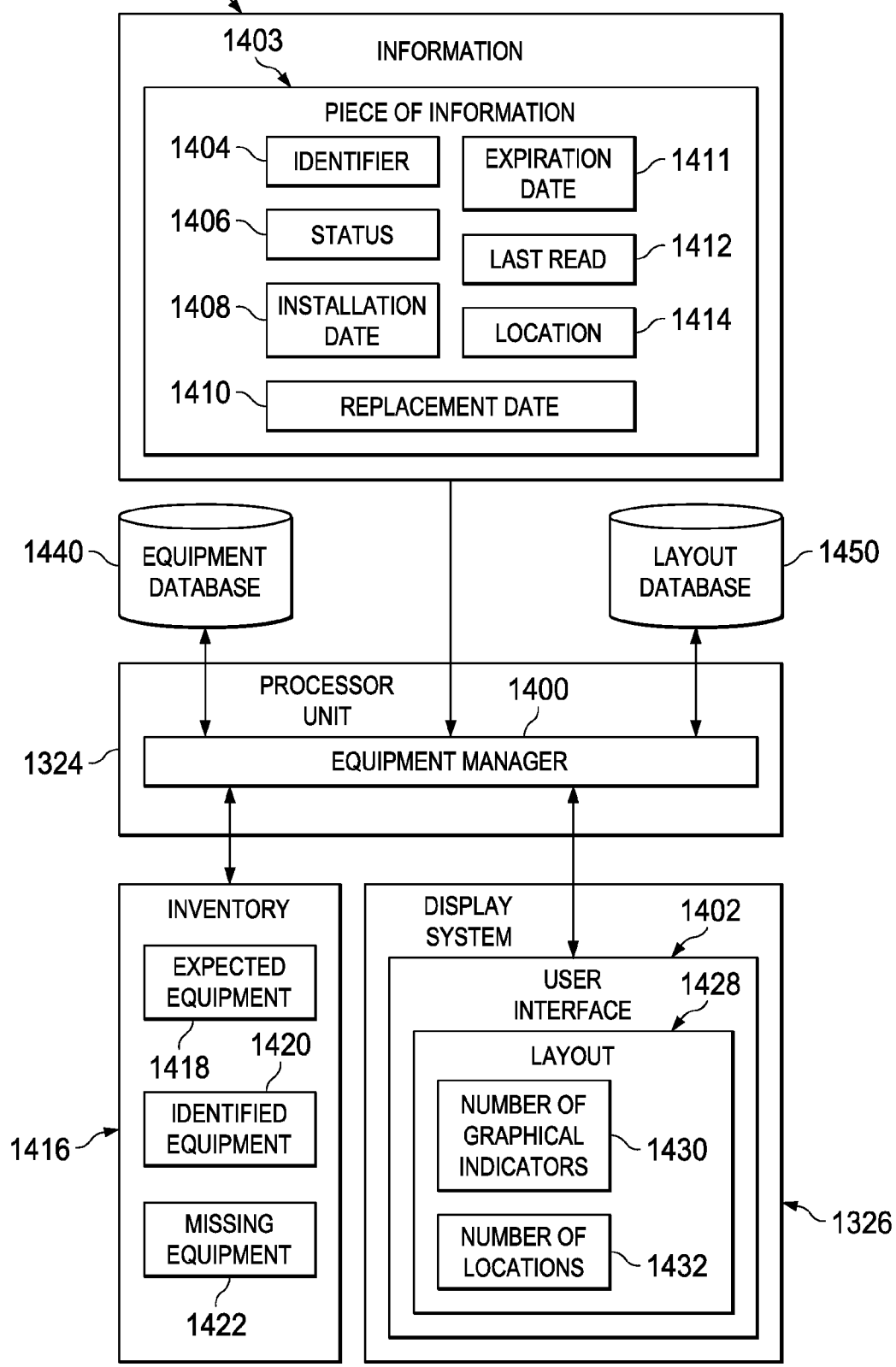
FIG. 14 is an illustration of a block diagram of components running on a processor unit in accordance with an advantageous embodiment.

Turning now to FIG. 14, an illustration of a block diagram of components running on a processor unit is depicted in accordance with an advantageous embodiment. In this illustrative example, processor unit 1324 may include equipment manager 1400. Equipment manager 1400 may be implemented using hardware, software, or a combination of the two. When equipment manager 1400 includes software, the software may run on processor unit 1324. When these components include hardware, the hardware may be part of processor unit 1324.

Equipment manager 1400 receives information 1334 and processes information 1334. Equipment manager 1400 may display user interface 1402 on display system 1326. Display system 1326 may be one or more display devices. The display device may be, for example, without limitation, a liquid crystal display, a light emitting diode display, or some other suitable type of display device.

As depicted, information 1334 may include piece of information 1403 for a piece of equipment in set of equipment 1302 in FIG. 13. As depicted, piece of information 1403 may include one or more of identifier 1404, status 1406, installation date 1408, replacement date 1410, expiration date 1411, last read 1412, location 1414, and/or other suitable types of information for a piece of equipment in set of equipment 1302.

Identifier 1404 identifies the piece of equipment. Identifier 1404 may be a unique identifier for the piece of equipment.

Status 1406 identifies a status of the piece of equipment from which piece of information 1403 was received. In particular, status 1406 may identify the health of a piece of equipment. Status 1406 may be, for example, operational, non-operational, need maintenance, or other suitable types of status.

Installation date 1408 identifies a date when the wireless tag transmitting piece of information 1403 was installed on the piece of equipment. Replacement date 1410 identifies when the wireless tag should be replaced.

Expiration date 1411 may be used to indicate when a piece of equipment should be replaced or when maintenance should be performed on a piece of equipment. Last read 1412 identifies a last date on which information was read from the wireless tag. Location 1414 identifies a location of the wireless tag.

Further, processor unit 1324 is configured to display information 1334 on display system 1326. Further, processor unit 1324 may process information 1334 to form processed information.

In these illustrative examples, equipment manager 1400 may generate inventory 1416. Inventory 1416 is a list of equipment in set of equipment 1302 in FIG. 13. For example, identifier 1404 in information 1334 may be used to identify a piece of equipment located in interior 1304 of aircraft 1306.

Inventory 1416 may include expected equipment 1418, identified equipment 1420, and missing equipment 1422, as well as other types of equipment. Expected equipment 1418 may be identified from equipment database 1440. Expected equipment 1418 is the equipment that should be present in interior 1304 of aircraft 1306.

In some cases, some pieces of equipment may be missing or removed. As a result, set of equipment 1302 in interior 1304 of aircraft 1306 may not be the same as expected equipment 1418. Expected equipment 1418 in inventory 1416 may be identified from equipment database 1440.

Identified equipment 1420 is equipment for which information 1334 is received from set of wireless tags 1312. In other words, set of equipment 1302 forms identified equipment 1420.

Missing equipment 1422 is equipment in expected equipment 1418 that is not found in identified equipment 1420. Missing equipment 1422 may occur in a number of different ways. For example, missing equipment 1422 may be present if a piece of equipment has been removed from interior 1304 of aircraft 1306. As another example, missing equipment 1422 also may be present if a wireless tag associated with a piece of equipment does not respond to interrogator 1322 in FIG. 13.

Additionally, status 1406 may be, for example, an indication of whether the equipment is operational, needs maintenance, or needs replacement. Status 1406 also may indicate whether tampering has occurred with respect to identified equipment 1420. In these illustrative examples, status 1406 is identified from information 1334 received from set of wireless tags 1312.

In this illustrative example, inventory 1416 may be sent to equipment database 1440. Equipment database 1440 may store a history of equipment found in interior 1304 of aircraft 1306. This history may include information about set of equipment 1302. The information may include, for example, status 1406, last read 1412, location 1414, and/or other suitable information.

In these illustrative examples, user interface 1402 may be displayed on display system 1326. Equipment manager 1400 may display layout 1428 in user interface 1402 on display system 1326. Equipment manager 1400 may obtain a layout that corresponds to the aircraft in which equipment is to be identified from layout database 1450. Layout database 1450 is a database containing layouts of different types of aircraft. In this illustrative example, equipment manager 1400 obtains layout 1428 for interior 1304 of aircraft 1306 from layout database 1450.

In these illustrative examples, layout 1428 is a layout of interior 1304 of aircraft 1306. For example, layout 1428 may identify features in interior 1304, such as closets, lavatories, seats, aisles, monuments, and other features. Layout 1428 may be two-dimensional, three-dimensional, or a combination of the two.

In the illustrative examples, number of graphical indicators 1430 for set of equipment 1302 is displayed on layout 1428. Number of graphical indicators 1430 are displayed in number of locations 1432 corresponding to number of locations 1310 in FIG. 13 where set of equipment 1302 is located in interior 1304 of aircraft 1306. For example, if a fire extinguisher is located in a closet, the graphical indicator for that fire extinguisher may be displayed on the closet in layout 1428.

In these illustrative examples, number of locations 1310 for set of equipment 1302 may be identified from information 1334 received from set of wireless tags 1312 in FIG. 13. For example, a tag in set of wireless tags 1312 may send an identification of its location using a coordinate system for the aircraft. In other illustrative examples, the signal strength from a wireless tag in set of wireless tags 1312 with the location of equipment scanner 1318 may be used to identify a location of the piece of equipment.

Number of graphical indicators 1430 may provide additional information. For example, number of graphical indicators 1430 may identify the status for set of equipment 1302. Additionally, number of graphical indicators 1430 also may identify the type of equipment present.

Number of graphical indicators 1430 may take a number of different forms. For example, without limitation, number of graphical indicators 1430 may be an icon, font, a geometric shape, color, shape, size, text, and types of graphical indicators.

Further, any equipment in set of equipment 1302 in missing equipment 1422 may be displayed in user interface 1402. For example, number of graphical indicators 1430 may be used to identify any missing equipment in missing equipment 1422. With the identification of missing equipment 1422, additional inspections may be made to determine whether the equipment is absent from those locations, the wireless tags for the equipment does not operate, or if some other situation has occurred such that the wireless tags for the equipment in missing equipment 1422 cannot be read.

Figure 15:
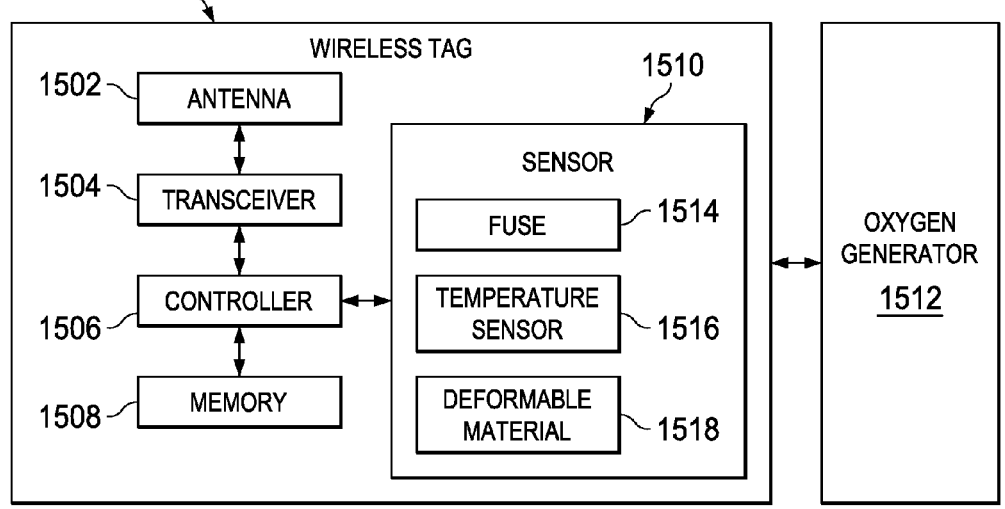
FIG. 15 is an illustration of a block diagram of a wireless tag in accordance with an advantageous embodiment.

Turning next to FIG. 15, an illustration of a block diagram of a wireless tag is depicted in accordance with an advantageous embodiment. As depicted, wireless tag 1500 is an example of a wireless tag that may be used in set of wireless tags 1312 in FIG. 13.

In this illustrative example, wireless tag 1500 is a passive tag. In other words, wireless tag 1500 does not include a power source. As depicted, wireless tag 1500 includes antenna 1502, transceiver 1504, controller 1506, memory 1508, and sensor 1510.

Antenna 1502 is configured to receive signals from interrogator 1322 in equipment scanner 1318. Further, antenna 1502 also may send signals. Transceiver 1504 is configured to receive signals detected by antenna 1502 and send those signals to controller 1506 for processing. Transceiver 1504 also may generate signals for transmission by antenna 1502.

Controller 1506 is configured to process signals received from transceiver 1504. For example, controller 1506 may retrieve information from memory 1508 and send that information to transceiver 1504 for transmission as a signal through antenna 1502. The information in memory 1508 may be, for example, without limitation, piece of information 1403 in FIG. 14.

Sensor 1510 is configured to measure physical quantities and generate information. This information is sent to controller 1506. Controller 1506 may process, send, store, and/or perform some other suitable action with the information generated by sensor 1510.

Further, sensor 1510, in some illustrative examples, may be configured to detect exposure to a temperature. For example, if wireless tag 1500 is associated with oxygen generator 1512, sensor 1510 in wireless tag 1500 is configured to detect exposure of wireless tag 1500 to a temperature at which oxygen generator 1512 operates to generate oxygen.

In these illustrative examples, this temperature may be about 400 degrees Fahrenheit. Sensor 1510 may be configured to detect a temperature at or below about 400 degrees Fahrenheit. Of course, sensor 1510 may be configured to detect any desired temperature depending on the piece of equipment with which wireless tag 1500 is associated.

In these illustrative examples, sensor 1510 may take a number of different forms when wireless tag 1500 is associated with oxygen generator 1512. For example, sensor 1510 may be at least one of fuse 1514, temperature sensor 1516, deformable material 1518, and other suitable types of sensors.

When sensor 1510 takes the form of fuse 1514, exposure of fuse 1514 to the temperature selected for oxygen generator 1512 may cause fuse 1514 to melt in a manner that prevents controller 1506 or other components in wireless tag 1500 from operating. As a result, when fuse 1514 is exposed to the selected temperature, wireless tag 1500 no longer operates to send information to interrogator 1322 in equipment scanner 1318.

Temperature sensor 1516 records temperatures and may store those temperatures in memory 1508. If the selected temperature or a greater temperature is detected, controller 1506 may be configured to send an indication that the selected temperature has been reached when interrogated by equipment scanner 1318.

Deformable material 1518 may be a structure for wireless tag 1500. Deformable material 1518 is configured to deform when the selected temperature is reached. Deformation of deformable material 1518 is configured to cause wireless tag 1500 to be inoperative. In other words, when deformable material 1518 deforms, information is not sent by wireless tag 1500 when wireless tag 1500 is interrogated by equipment scanner 1318. Further, deformation of deformable material 1518 also may provide a visual indication that wireless tag 1500 has been exposed to the selected temperature.

In this manner, wireless tag 1500 may operate to indicate that oxygen generator 1512 may have been used. In this manner, maintenance replacement of oxygen generator 1512 may be performed. As another example, wireless tag 1500 may be implemented using a passive tag, an active tag, or some other suitable type of tag.

The illustration of equipment management system 1300 and components therein in FIGS. 13-15 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, in other illustrative embodiments, additional equipment scanners in addition to equipment scanner 1318 may be used in interior 1304 of aircraft 1306. Each equipment scanner may be used in a different part of aircraft 1306. As another illustrative example, additional wireless tags also may be associated with structures in interior 1304 of aircraft 1306. These additional wireless tags may act as markers to aide in identifying locations of pieces of equipment in set of equipment 1302.

In yet another example, some components in wireless tag 1500 may be omitted depending on the particular implementation. For example, sensor 1510 may be omitted in some illustrative examples.

Figure 16:
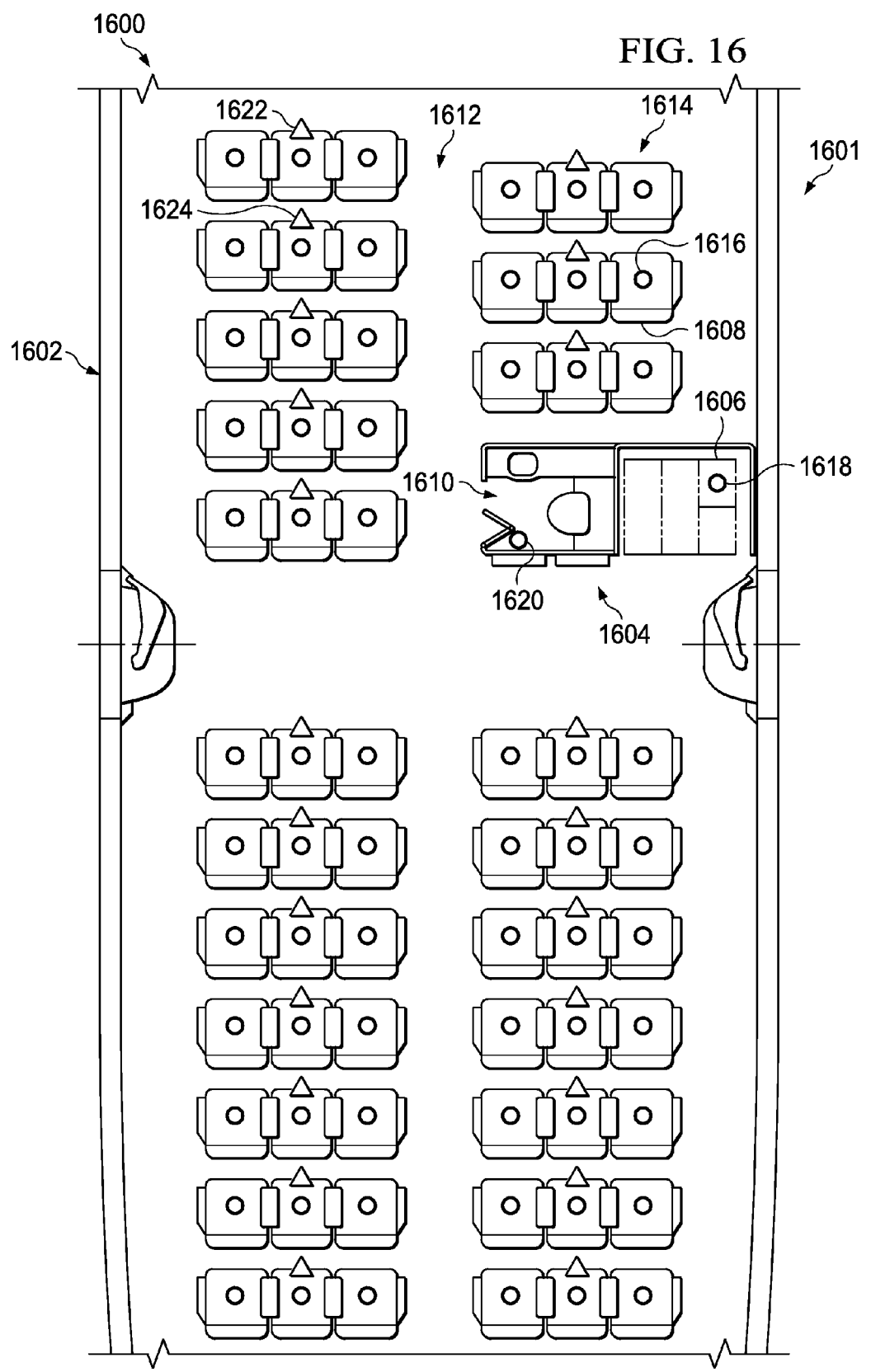
FIG. 16 is an illustration of a layout in a user interface in accordance with an advantageous embodiment.

Turning next to FIG. 16, an illustration of a layout in a user interface is depicted in accordance with an advantageous embodiment. As depicted, display 1600 is an example of a display for user interface 1402 that may be displayed on display system 1326 in FIG. 14.

In this illustrative example, portion 1601 of layout 1602 is an example of a portion of layout 1428 in FIG. 14. Layout 1602 is a layout of the interior of an aircraft such as aircraft 1306 in FIG. 13. In this example, portion 1601 of layout 1602 is the part of layout 1428 that is shown on display 1600 in display system 1326. Portion 1601 of layout 1602 may change based on user input or in a fashion similar to a moving map.

In this illustrative example, features 1604 are shown in layout 1602. For example, closet 1606, seat 1608, lavatory 1610, and aisle 1612 are example of features 1604.

Graphical indicators 1614 are displayed on layout 1602. In these illustrative examples, graphical indicators 1614 are displayed in locations in layout 1602 corresponding to the locations for the pieces of equipment in the aircraft.

For example, graphical indicator 1616 is displayed on seat 1608, graphical indicator 1618 is displayed in closet 1606, and graphical indicator 1620 is displayed in lavatory 1610. In this depicted example, graphical indicators 1614 display equipment that has been identified in the aircraft. In these illustrative examples, graphical indicators 1616, 1618, 1620 are circles. These circles may be used to indicate that the wireless tags are associated with equipment located in the cabin. As another example, graphical indicator 1622 and graphical indicator 1624 are triangles. These triangles may be used to indicate that the equipment associated with the tags are located in the ceiling or crown of the aircraft.

Figure 17:
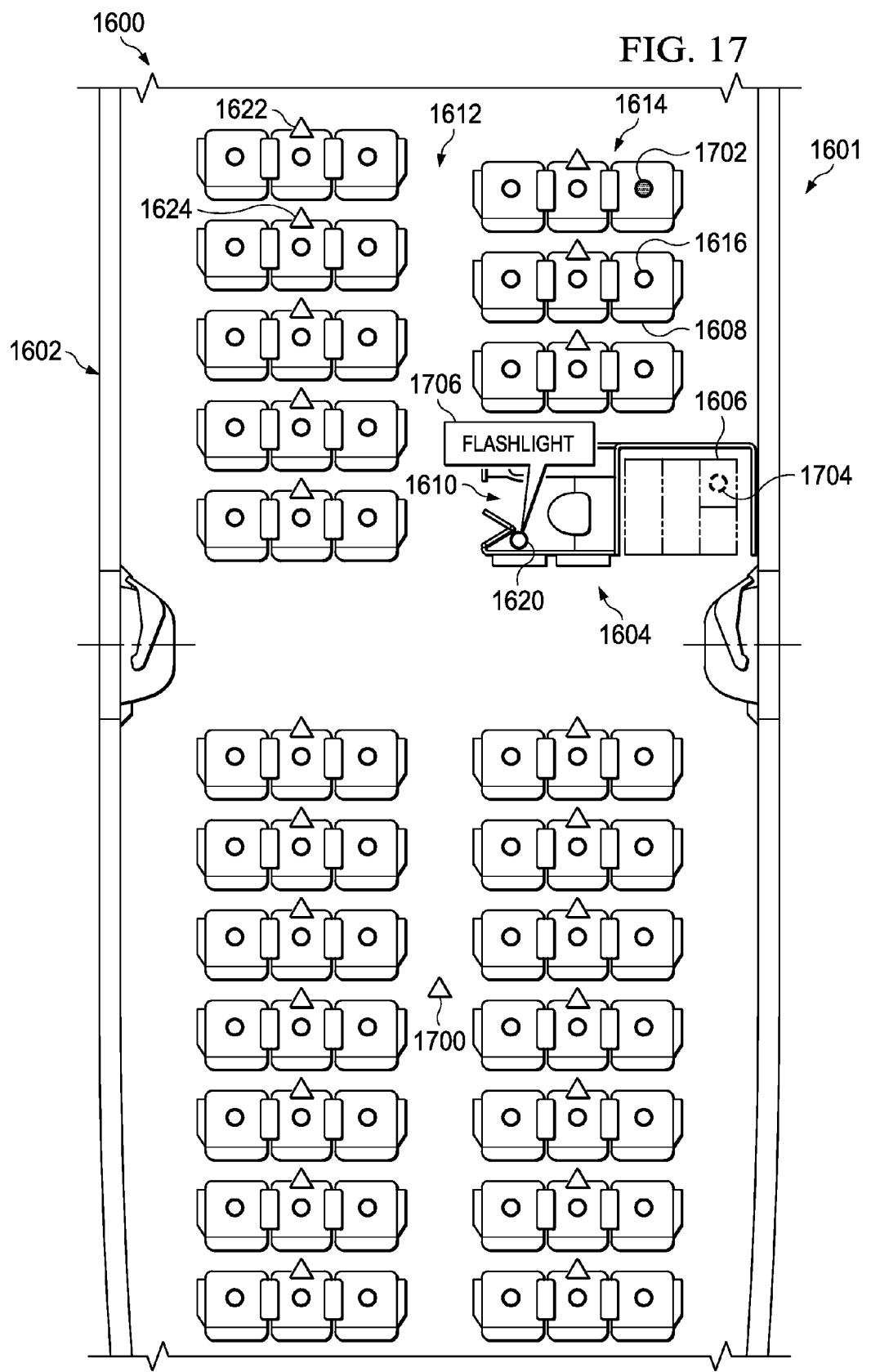
FIG. 17 is an illustration of a layout in a user interface in accordance with an advantageous embodiment.

Turning now to FIG. 17, an illustration of a layout in a user interface is depicted in accordance with an advantageous embodiment. In this example, display 1600 includes graphical indicator 1700. Graphical indicator 1700 is an icon that indicates a location of equipment scanner 1318 within interior 1304 of aircraft 1306 in FIG. 13. Icon 1700 is displayed in the corresponding location for equipment scanner 1318 in portion 1601 of layout 1602. Further, graphical indicator 1700 also may indicate a direction at which equipment scanner 1318 is pointed. Also, portion 1601 may change based on user input or in a fashion similar to a moving map.

In this illustrative example, graphical indicator 1702 is shown as a solid circle. Graphical indicator 1702 is displayed in place of graphical indicator 1616 in layout 1602 in FIG. 16. This solid circle may indicate the piece of equipment at this location needs maintenance. As yet another example, graphical indicator 1704 is displayed in place of graphical indicator 1618 in FIG. 16. Graphical indicator 1704 is a circle formed with a dotted line. Graphical indicator 1704 may indicate that the piece of equipment in closet 1606 is missing. Graphical indicator 1704 may be displayed when information is not received from a piece of equipment that is expected to be present at a particular location.

In another illustrative example, graphical indicator 1706 may be displayed in association with graphical indicator 1620. In this example, graphical indicator 1706 may take the form of a tool tip in which information may be displayed. Graphical indicator 1706 may provide additional information about the piece of equipment in lavatory 1610 in this example. In this example, graphical indicator 1706 identifies the piece of equipment as a flashlight. Of course, other information may be displayed in graphical indicator 1706. For example, last read, last maintenance, next scheduled maintenance, and other suitable information may be displayed using graphical indicator 1706. This additional information in graphical indicator 1706 may be displayed in response to a selection of graphical indicator 1620.

The illustration of layout 1602 on display 1600 for user interface 1402 in FIGS. 16 and 17 is not meant to limit the manner in which user interfaces may be implemented. For example, in some illustrative examples, an entire cabin may be displayed rather than a portion of the cabin. As another illustrative example, other types of graphical indicators for graphical indicators 1614 may be used. For example, other icons or shapes may be used in addition to the ones illustrated in display 1600. Further, graphical indicators 1614 also may include the use of color, animation, and other graphical features.

Figure 18:
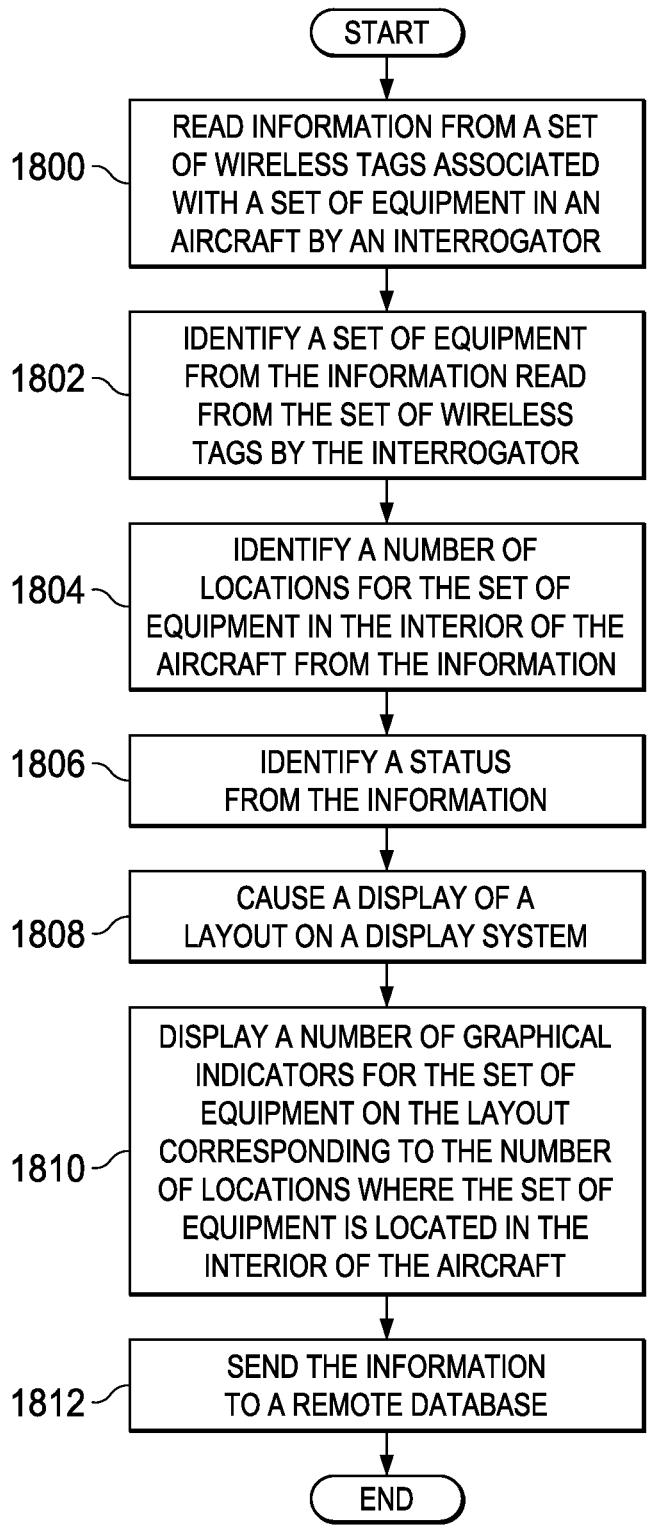
FIG. 18 is an illustration of a flowchart for managing equipment on an aircraft in accordance with an advantageous embodiment.

Turning now to FIG. 18, an illustration of a flowchart for managing equipment on an aircraft is depicted in accordance with an advantageous embodiment. The process illustrated in FIG. 18 may be implemented using equipment management system 1300 in FIG. 13.

The process begins by an interrogator in an equipment scanner reading information from a set of wireless tags associated with a set of equipment in an aircraft (operation 1800). The interrogator may be, for example, interrogator 1322 in equipment scanner 1318. The processor unit in an equipment scanner identifies a set of equipment from the information read from the set of wireless tags by the interrogator (operation 1802). The processor unit may be, for example, processor unit 1324.

The processor unit also may identify a number of locations for the set of equipment in the interior of the aircraft from the information (operation 1804). Additionally, the processor unit also may identify a status from the information (operation 1806).

The processor unit then causes a display of a layout on a display system (operation 1808). The layout may be, for example, layout 1428, and the display system may be display system 1326. The processor unit also displays a number of graphical indicators for the set of equipment on the layout corresponding to the number of locations where the set of equipment is located in the interior of the aircraft (operation 1810). The processor unit also may send the information to a remote database (operation 1812) with the process terminating thereafter. In operation 1812, the remote database may be, for example, equipment database 1440 in FIG. 14.

Figure 19:
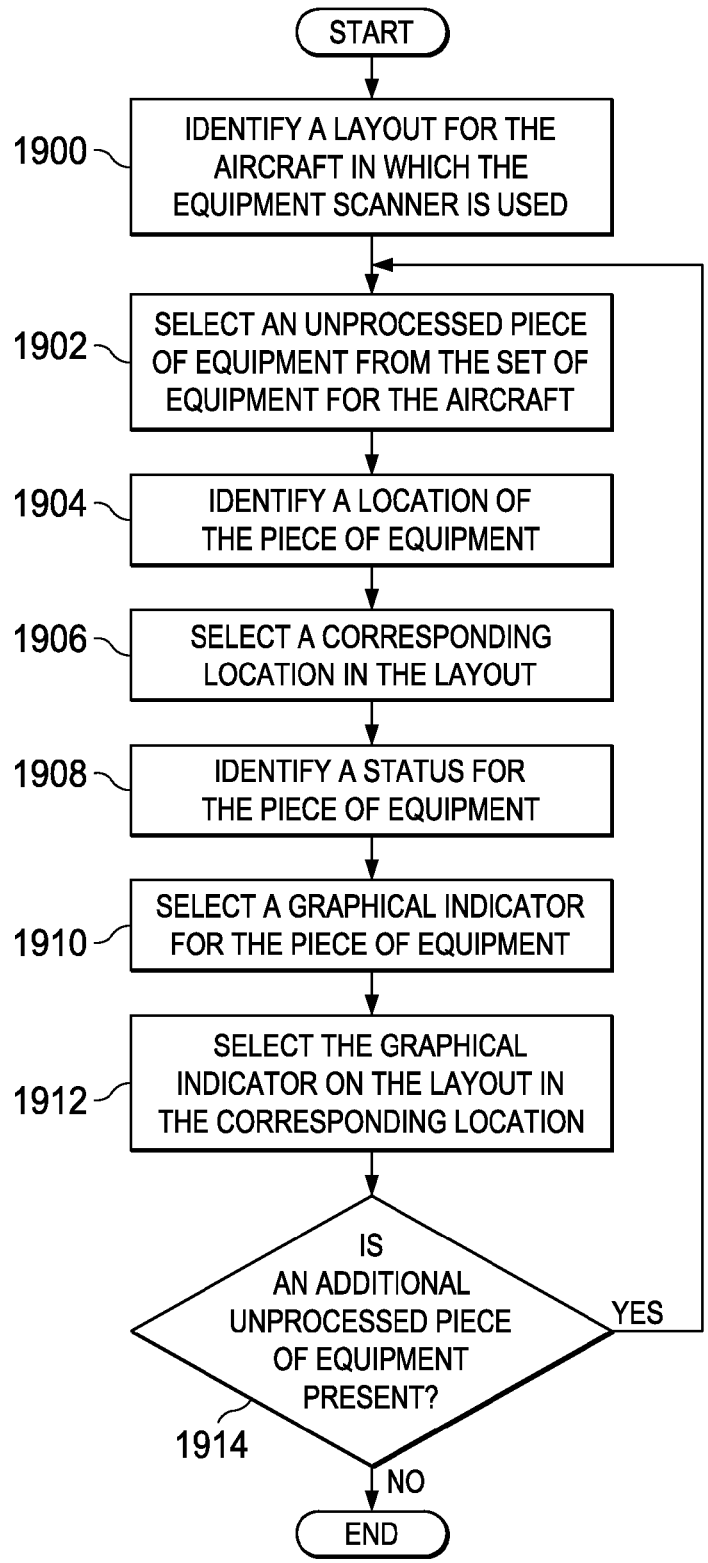
FIG. 19 is a flowchart of a process for displaying information about equipment in an aircraft in accordance with an advantageous embodiment.

Turning next to FIG. 19, a flowchart of a process for displaying information about equipment in an aircraft is depicted in accordance with an advantageous embodiment. This process may be implemented equipment manager 1400 to display information 1334 in FIG. 13 on user interface 1402 on display system 1326 in FIG. 14. In particular, information 1334 may be processed and displayed on layout 1428 in user interface 1402.

The process begins by identifying a layout for the aircraft in which the equipment scanner is used (operation 1900). The layout may be, for example, layout 1428. This layout may be identified using equipment database 1440.

The process then selects an unprocessed piece of equipment from the set of equipment for the aircraft (operation 1902). The process then identifies a location of the piece of equipment (operation 1904). This information may be identified from a piece of the information associated with the piece of equipment. This piece of information may be, for example, piece of information 1403 in FIG. 14.

With the location for the piece of equipment, the process selects a corresponding location in the layout (operation 1906). This corresponding location is a location that corresponds to the location of the piece of equipment in the aircraft. For example, if the piece of equipment is located in a closet in the aircraft, the corresponding location for the piece of equipment in the layout is the portion of the layout that shows the closet.

The process identifies a status for the piece of equipment (operation 1908). The status may be identified from the piece of information received from the piece of equipment.

Next, the process selects a graphical indicator for the piece of equipment (operation 1910). This graphical indicator may be selected in a number of different ways. For example, the graphical indicator may be selected based on a location of the piece of equipment, the type of equipment, a status, and other suitable information.

The process then selects the graphical indicator on the layout in the corresponding location (operation 1912). A determination is then made as to whether an additional unprocessed piece of equipment is present (operation 1914). If an additional unprocessed piece of equipment is present, the process returns to operation 1902. Otherwise, the process terminates.

Figure 20:
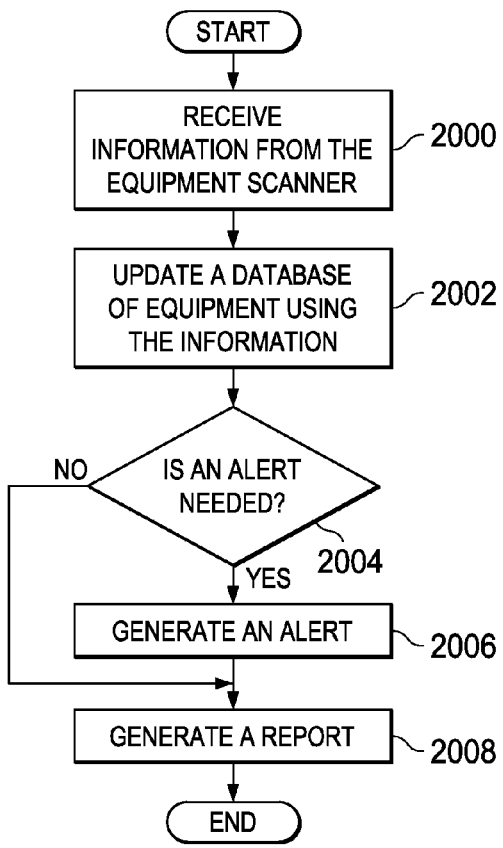
FIG. 20 is a flowchart of a process for processing information received from an equipment scanner in accordance with an advantageous embodiment.

Turning now to FIG. 20, a flowchart of a process for processing information received from an equipment scanner is depicted in accordance with an advantageous embodiment. This process may be implemented in computer system 1338 in FIG. 13 in the illustrative examples.

The process begins by receiving information from the equipment scanner (operation 2000). In these illustrative examples, the information may be information 1334 received from equipment scanner 1318 in FIG. 13. The process updates a database of equipment using the information (operation 2002). In operation 2002, the database may be equipment database 1440 in FIG. 14.

A determination is made as to whether an alert is needed (operation 2004). This determination may be made in a number of different ways depending on the particular implementation. For example, an alert may be needed if equipment is missing, equipment needs maintenance, tampering has been detected, or other suitable events have occurred.

If an alert is needed, an alert is generated (operation 2006). This alert may take various forms. For example, the alert may be an email message, a text message, a voice message, and/or some other suitable type of alert. The process then generates a report (operation 2008) with the process terminating thereafter. This report may include information about the status of the equipment, whether maintenance is needed, and other suitable information.

With reference again to operation 2004, if an alert is not needed, the process proceeds to operation 2008 as described above.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1804 and/or operation 1806 in FIG. 18 may be omitted in some embodiments. As another example, identifying a status of a piece of equipment in operation 1908 in FIG. 19 may be omitted in some embodiments.

Thus, one or more advantageous embodiments provide a method and apparatus for inventorying equipment on an aircraft. Equipment management system 1300 may be used to inventory or check set of equipment 1302 and, in particular, set of emergency equipment 1308.

Equipment scanner 1318 provides an operator an ability to identify equipment without manually searching for the equipment. With the use of equipment scanner 1318 and set of wireless tags 1312 associated with set of equipment 1302, the speed at which equipment may be identified may be increased as compared to manual searches and visual identifications of the equipment. Further, the information identified about the equipment may be sent to a remote location for processing. This processing of the information may be used to schedule maintenance or generate alerts if equipment needs to be replaced, has been tampered with, or cannot be found.

Turning now to FIG. 21, an illustration of a data processing system is depicted in accordance with an advantageous embodiment. Data processing system 2100 may be used to implement computer system 1338 as well as portions of equipment scanner 1318 in FIG. 13. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 may take the form of a bus system.

Processor unit 2104 serves to execute instructions for software that may be loaded into memory 2106. Processor unit 2104 may be a number of processors, a multi-processor core, or some other type of processor, depending on the particular implementation. In these illustrative examples, processor unit 2104 may be used to implement processor unit 1324 in equipment scanner 1318 in FIG. 13.

Memory 2106 and persistent storage 2108 are examples of storage devices 2116. A storage device is any piece of hardware that is capable of storing information, such as, for example, without limitation, data, program code in functional form, and/or other suitable information either on a temporary basis and/or a permanent basis. Storage devices 2116 also may be referred to as computer readable storage devices in these illustrative examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through a keyboard, a mouse, and/or some other suitable input device. Further, input/output unit 2112 may send output to a printer. Display 2114 provides a mechanism to display information to a user.

Instructions for the operating system, applications, and/or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 is located in a functional form on computer readable media 2120 that is selectively removable and may be loaded onto or transferred to data processing system 2100 for execution by processor unit 2104. Program code 2118 and computer readable media 2120 form computer program product 2122 in these illustrative examples. In one example, computer readable media 2120 may be computer readable storage media 2124 or computer readable signal media 2126.

In these illustrative examples, computer readable storage media 2124 is a physical or tangible storage device used to store program code 2118 rather than a medium that propagates or transmits program code 2118.

Alternatively, program code 2118 may be transferred to data processing system 2100 using computer readable signal media 2126. Computer readable signal media 2126 may be, for example, a propagated data signal containing program code 2118. For example, computer readable signal media 2126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2100 are not meant to provide architectural limitations to the manner in which different embodiments may be implemented. The different advantageous embodiments may be implemented in a data processing system including components in addition to and/or in place of those illustrated for data processing system 2100. Other components shown in FIG. 21 can be varied from the illustrative examples shown. The different embodiments may be implemented using any hardware device or system capable of running program code 2118.

Advantageous embodiments of the disclosure may be described in the context of aircraft manufacturing and service method 2200 as shown in FIG. 22 and aircraft 2300 as shown in FIG. 23. Turning first to FIG. 22, an illustration of an aircraft manufacturing and service method is depicted in accordance with an advantageous embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 may go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in which an advantageous embodiment may be implemented. In this example, aircraft 2300 is produced by aircraft manufacturing and service method 2200 in FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 2200 in FIG. 22.

As yet another example, one or more apparatus embodiments, method embodiments, or a combination thereof may be utilized during production stages, such as component and subassembly manufacturing 2206 and system integration 2208 in FIG. 22. One or more apparatus embodiments, method embodiments, or a combination thereof may be utilized while aircraft 2300 is in service 2212 and/or during maintenance and service 2214 in FIG. 22. The use of a number of the different advantageous embodiments may substantially expedite the assembly of and/or reduce the cost of aircraft 2300.

For example, one or more advantageous embodiments may be used to identify equipment in aircraft 2300 during in service 2212, during maintenance and service 2214, or a combination of the two. One or more advantageous embodiments may be used to perform an inventory of equipment, such as emergency equipment, in aircraft 2300. Further, one or more advantageous embodiments may be used to identify when maintenance or other actions may be needed with respect to the equipment in aircraft 2300.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
  an interrogator configured to read information from a set of wireless tags associated with a set of equipment in an aircraft, and further configured to receive GPS aircraft location information;

a display system;

a processor unit configured to adjust an interrogator radio frequency based on a received GPS aircraft location, to identify the set of equipment from the information read from the set of wireless tags by the interrogator to form identified equipment, to match locations for the set of wireless tags read to locations expected for the identified equipment and to identify locations in which the information has not been read from the set of wireless tags to identify missing equipment from the interior of the aircraft; display a layout of an interior of the aircraft on the display system; display a first number of graphical indicators for the set of equipment on the layout in a number of locations on the layout corresponding to a number of locations of where the identified equipment is located in the interior of the aircraft and a number of locations for the missing equipment in the interior of the aircraft; and a housing, the interrogator, the display system, and the processor unit associated with the housing to form an equipment scanner, the processor further configured to display a second graphical indicator that indicates a location of the equipment scanner within the interior of the aircraft.

2. The apparatus of claim 1 further comprising:
a communications unit configured to establish a wireless communications link with a remote data processing system.

3. The apparatus of claim 1, wherein the first number of graphical indicators identify the set of equipment.

4. The apparatus of claim 1, wherein the first number of graphical indicators indicate a status of the set of equipment.

5. The apparatus of claim 1, wherein the housing is selected from one of a portable housing and a hand-held housing, and wherein the second graphical indicator indicates an orientation of the housing within the interior of the aircraft with respect to the set of equipment in the interior of the aircraft.

6. The apparatus of claim 1, wherein at least one wireless tag in the set of wireless tags comprises:
an antenna configured to send and receive wireless information to the processor unit;
a transceiver associated with the antenna;
a sensor associated with the wireless tag and connected to an oxygen generator in the set of equipment, wherein the sensor is configured to indicate exposure of the wireless tag to a temperature of approximately 400 degrees Fahrenheit at which the oxygen generator operates to generate oxygen and wherein the sensor provides the information to the transceiver.

7. The apparatus of claim 1, wherein the set of equipment is emergency equipment.

8. The apparatus of claim 7, wherein the emergency equipment is selected from at least one of an oxygen generator, a personal flotation device, a life raft, a flashlight, and a fire extinguisher.

9. A method for managing equipment on an aircraft, the method comprising:
receiving a GPS aircraft location;
adjusting an RFID interrogation radio frequency band based on the GPS aircraft location;
reading information from a set of wireless tags associated with a set of equipment in the aircraft;
identifying the set of equipment from the information read from the set of wireless tags by an interrogator using the interrogation radio frequency band to form identified equipment;
matching locations for the set of wireless tags read to locations expected for the identified equipment to identify locations in which the information has not been read from the set of wireless tags so as to identify missing equipment from the interior of the aircraft;
displaying a layout of an interior of the aircraft on a display system in an equipment scanner; and
displaying a first number of graphical indicators in the equipment scanner for the set of equipment on the layout in a number of locations on the layout corresponding to a number of locations of where the identified equipment is located in the interior of the aircraft and a number of locations for the missing equipment in the interior of the aircraft; and
displaying a second graphical indicator in the equipment scanner that indicates a location of the equipment scanner within the interior of the aircraft.

10. The method of claim 9 further comprising:
sending the information to a remote database.

11. The method of claim 9 further comprising:
generating at least one of a report and an alert based on the information.

12. The method of claim 9 further comprising:
identifying a status of the set of equipment from the information read from the set of wireless tags.

13. The method of claim 12 further comprising:
sending the status of the set of equipment to a remote database.

14. An apparatus comprising:
an antenna configured to send and receive wireless information to a unit remote from the antenna;
a transceiver associated with the antenna;
a controller associated with the transceiver;
a sensor associated with the controller and a wireless tag connected to an oxygen generator, wherein the wireless tag is configured to indicate exposure of the wireless tag to a temperature of about 400 degrees Fahrenheit at which the oxygen generator operates to generate oxygen, the sensor provides the information to the controller, and the controller provides the information to the transceiver, and wherein the sensor comprises a temperature sensor connected to a memory, the memory configured to store temperatures of the oxygen generator, and to provide the temperatures to the controller;
an interrogator associated with the unit configured to receive GPS location information for an aircraft in which the antenna, transceiver, controller, and sensor are located, and also configured to interrogate the antenna using a radio frequency; and
a processor associated with the interrogator, the processor configured to adjust the radio frequency used by the interrogator based on the GPS location for the aircraft.

15. The apparatus of claim 14 further comprising:
the oxygen generator configured to generate the oxygen in an aircraft.

16. The method of claim 9 further comprising displaying an orientation of the equipment scanner in the interior of the aircraft.

17. The apparatus of claim 14, wherein the sensor comprises a fuse that renders the wireless tag inoperable at a selected temperature.

18. The apparatus of claim 14, wherein the sensor comprises a deformable material configured to render the wireless tag inoperable at a selected temperature.

* * * * *